April 4, 1939.  G. W. EDMUNDS  2,152,841
WRITING MACHINE
Filed June 13, 1936   12 Sheets-Sheet 5
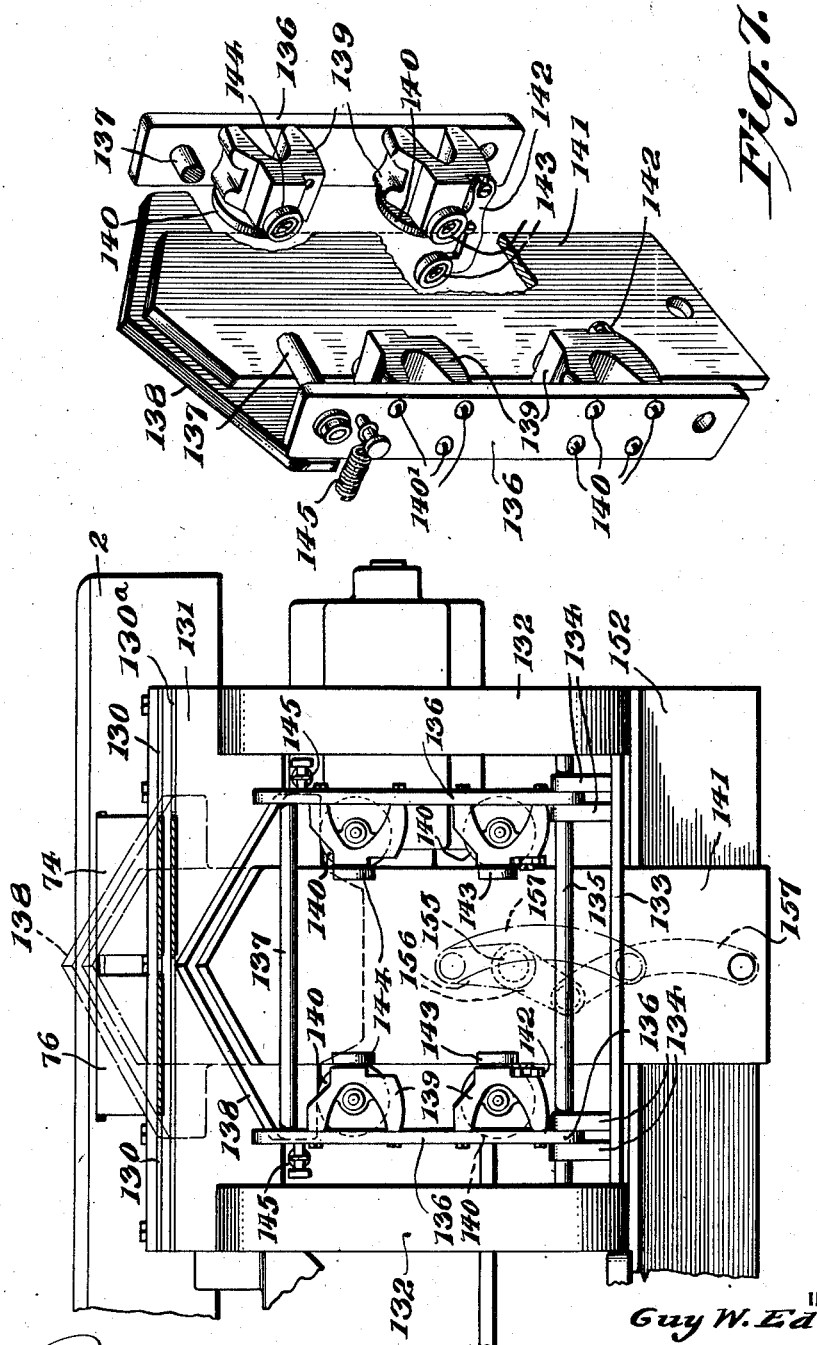

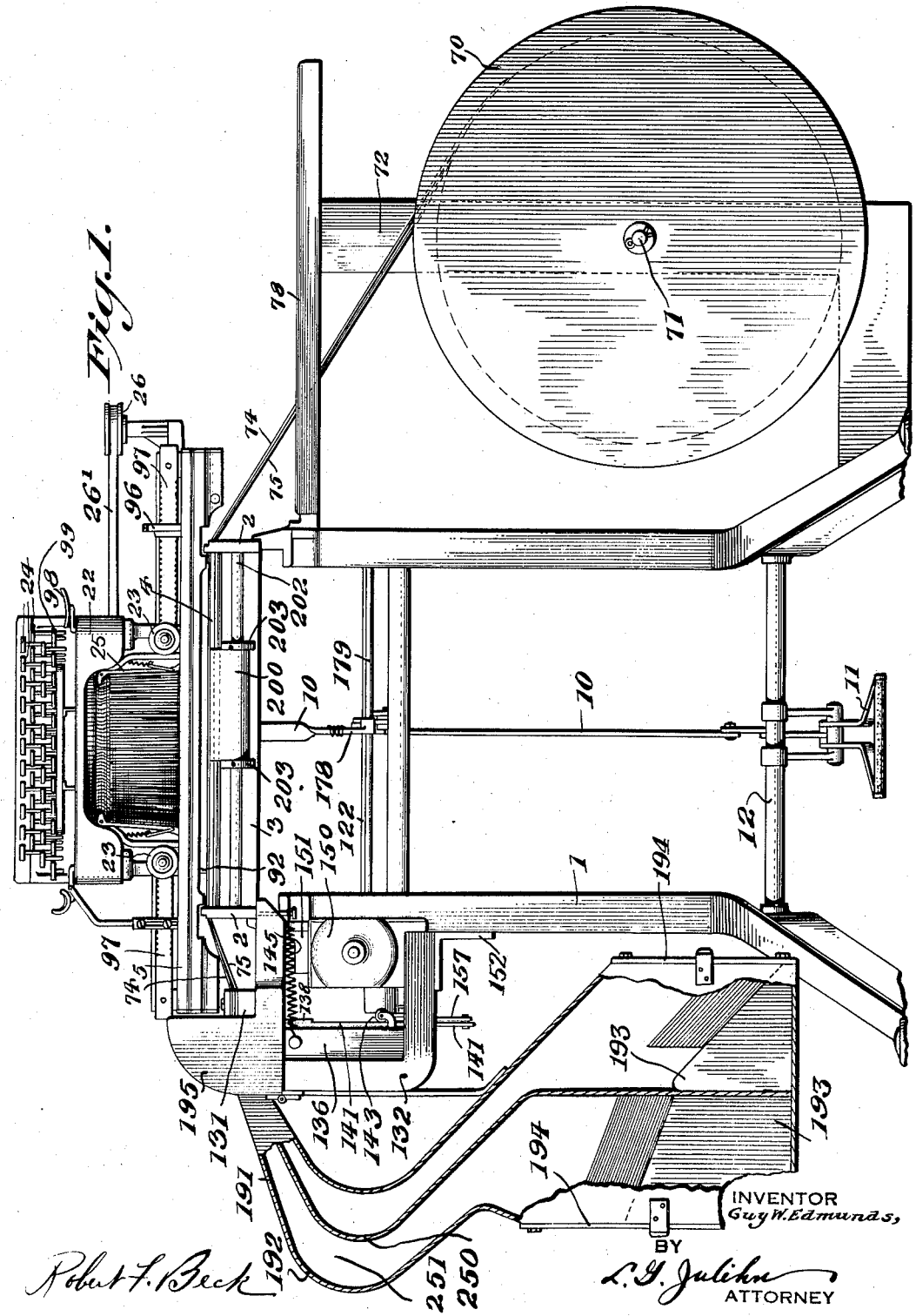

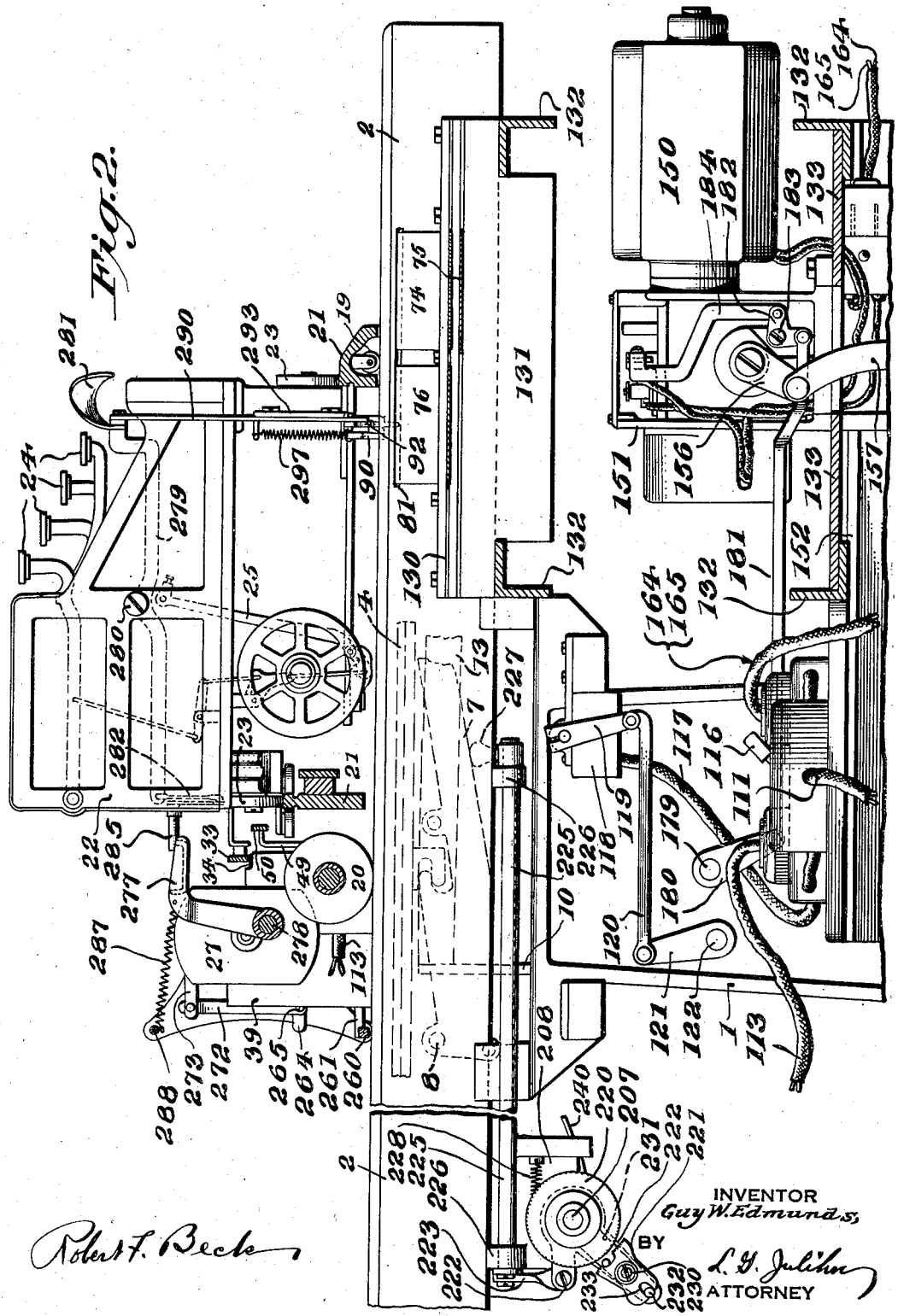

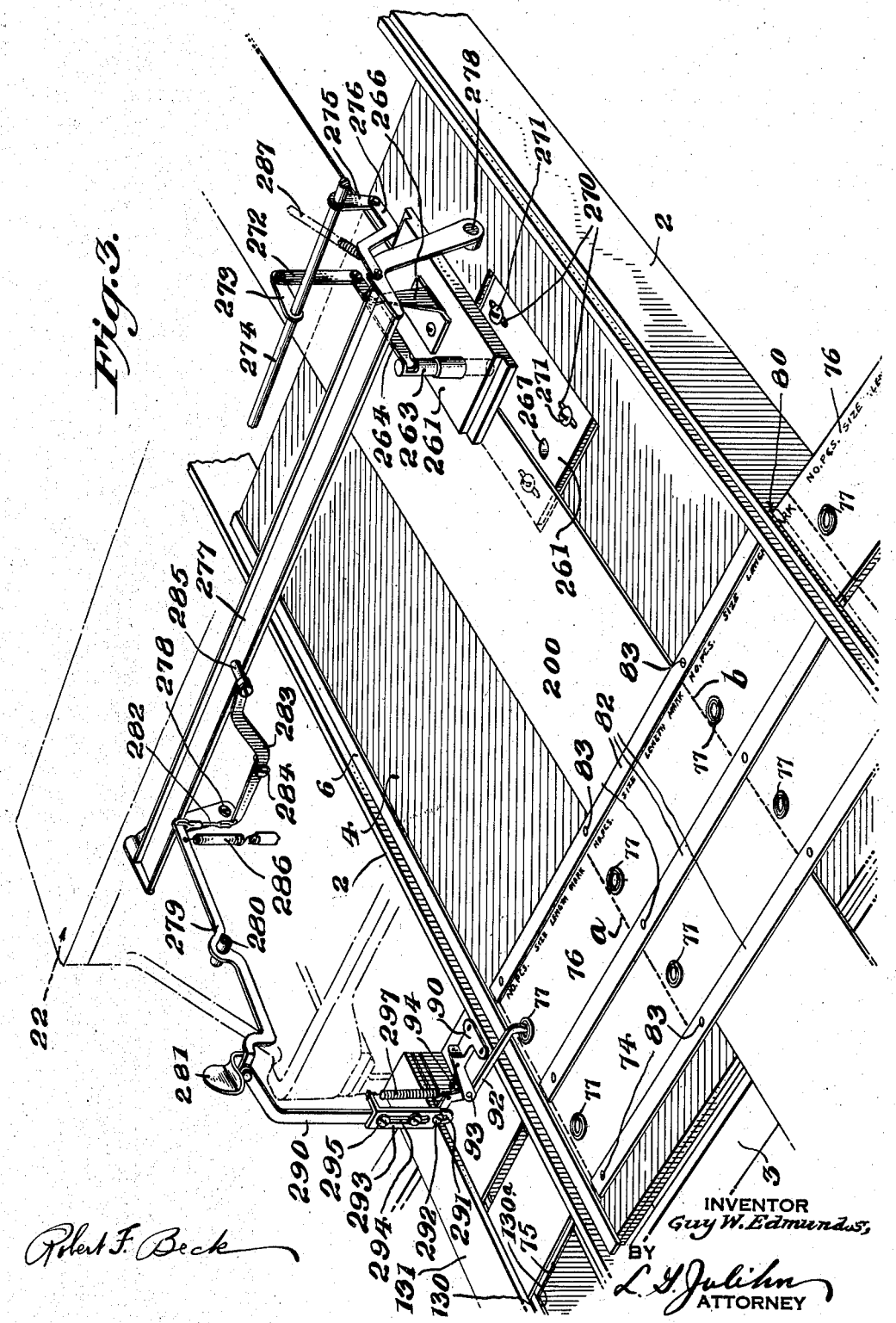

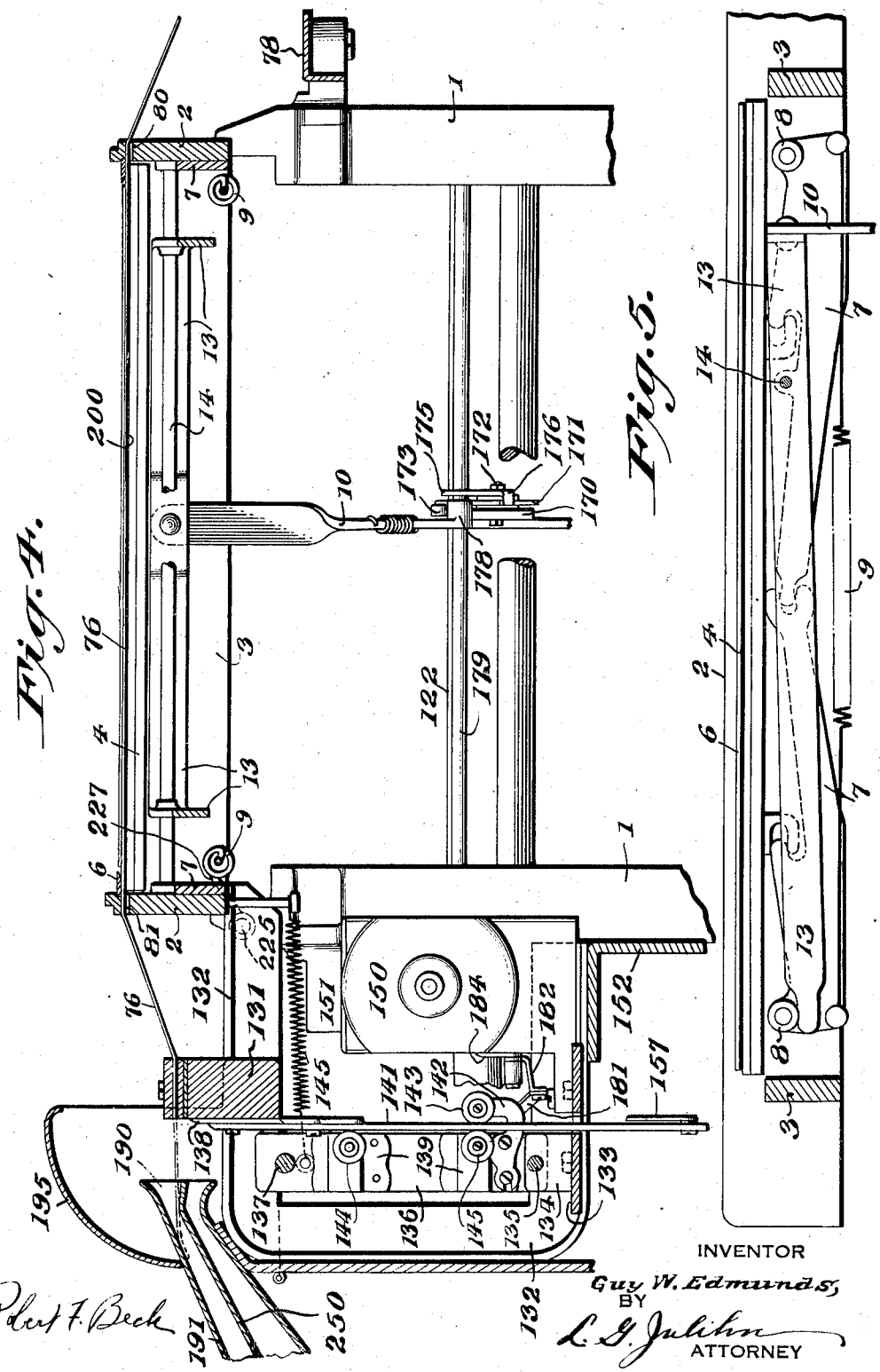

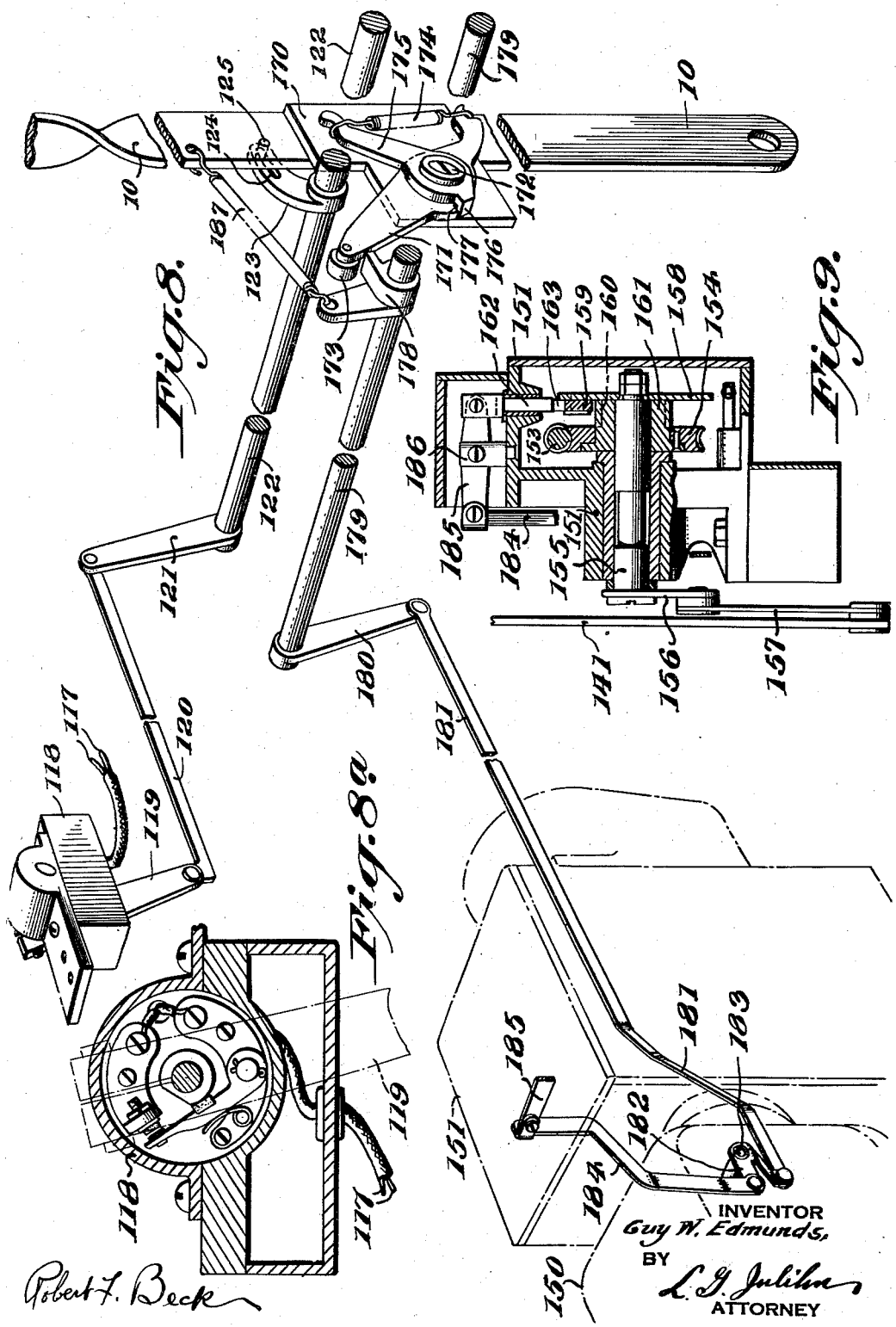

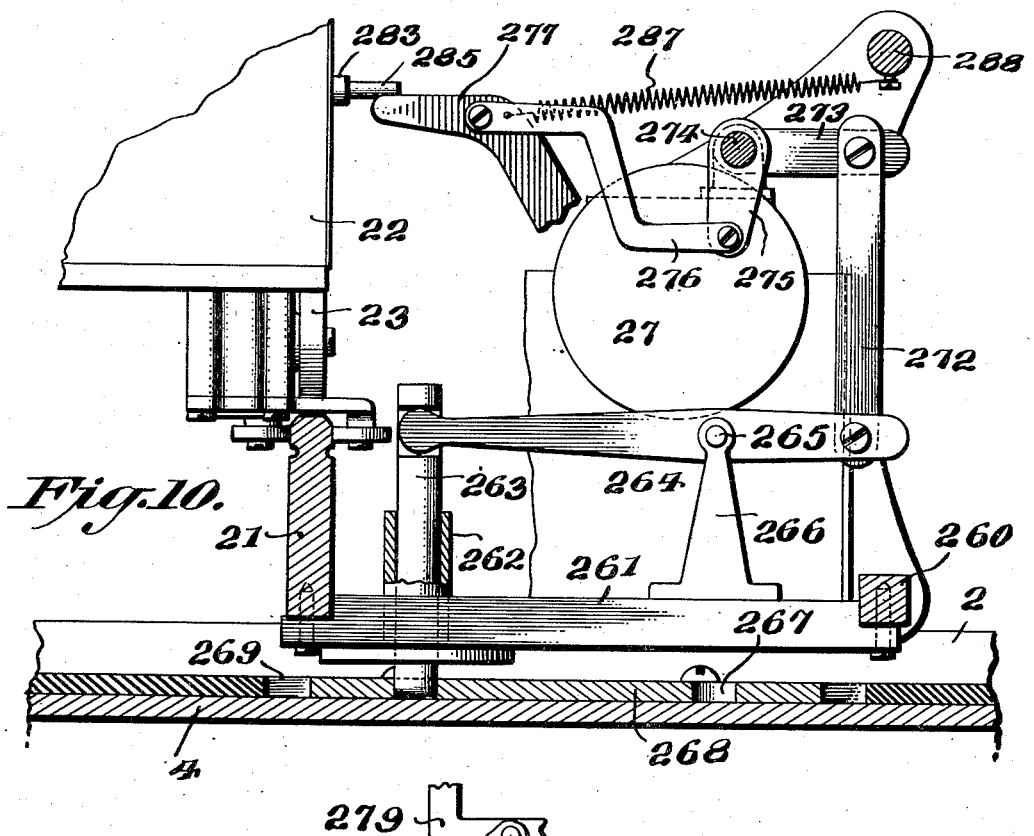

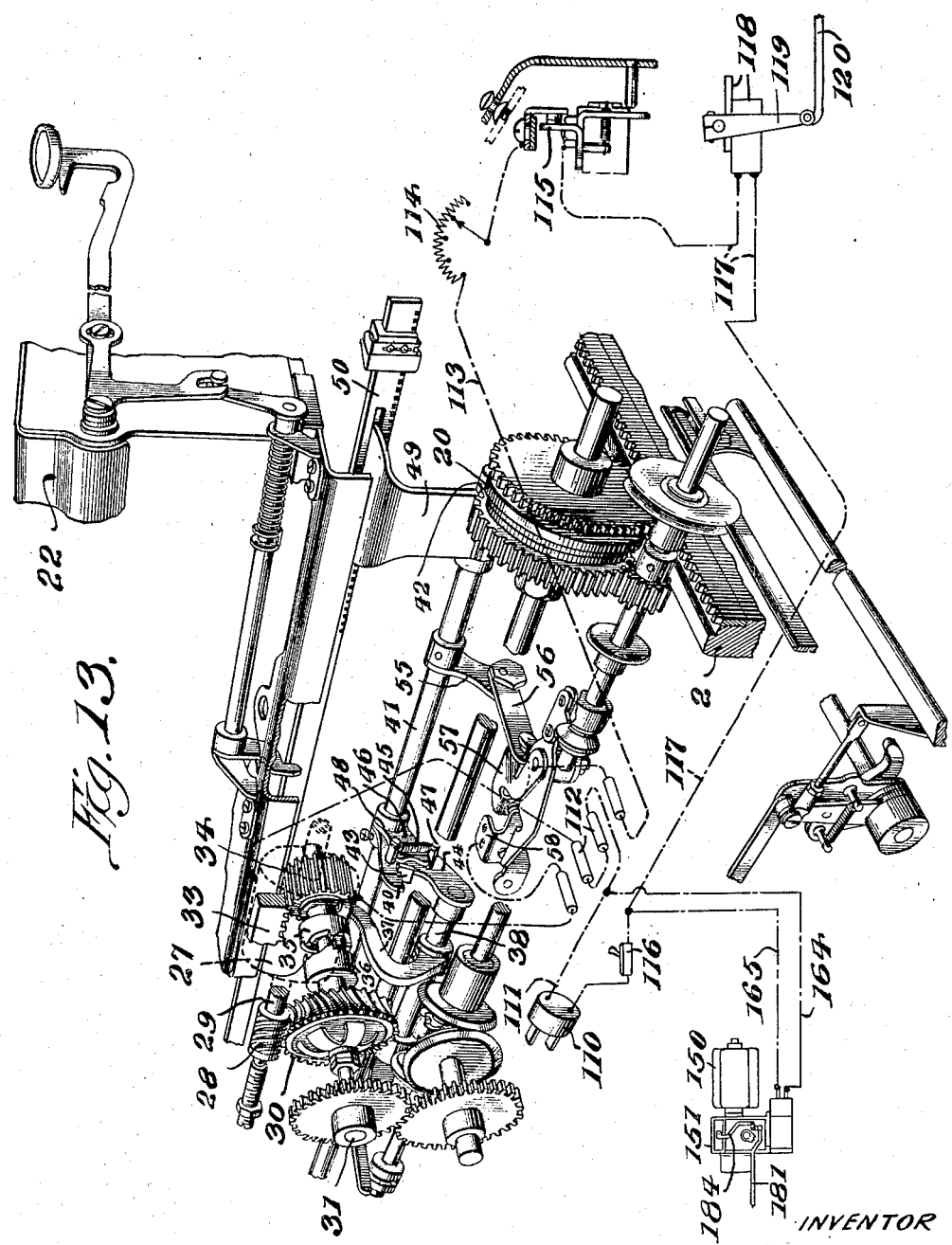

April 4, 1939.　　G. W. EDMUNDS　　2,152,841
WRITING MACHINE
Filed June 13, 1936　　12 Sheets-Sheet 9
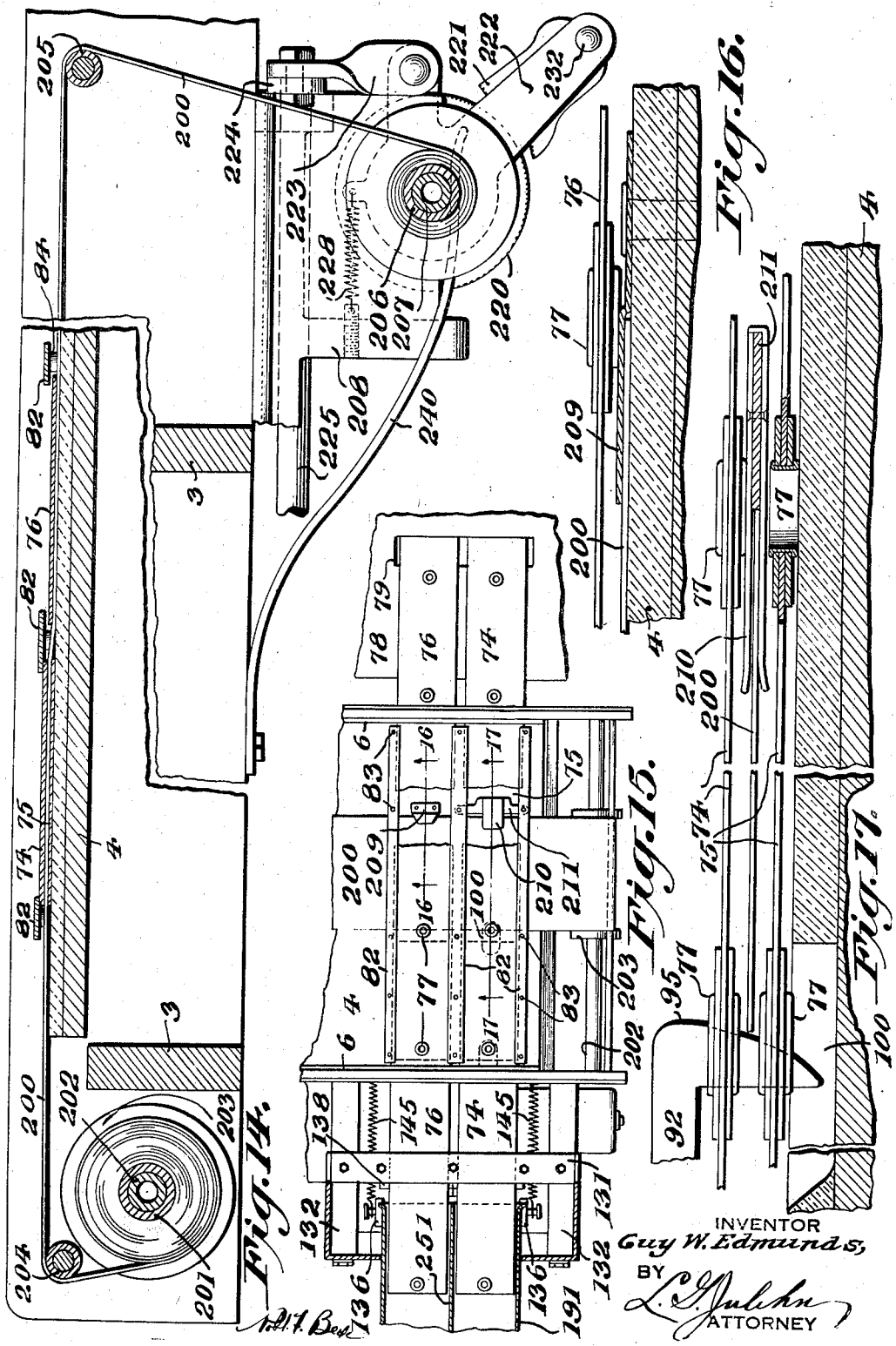
INVENTOR
Guy W. Edmunds,
BY
ATTORNEY April 4, 1939.　　G. W. EDMUNDS　　2,152,841
WRITING MACHINE
Filed June 13, 1936　　12 Sheets-Sheet 10
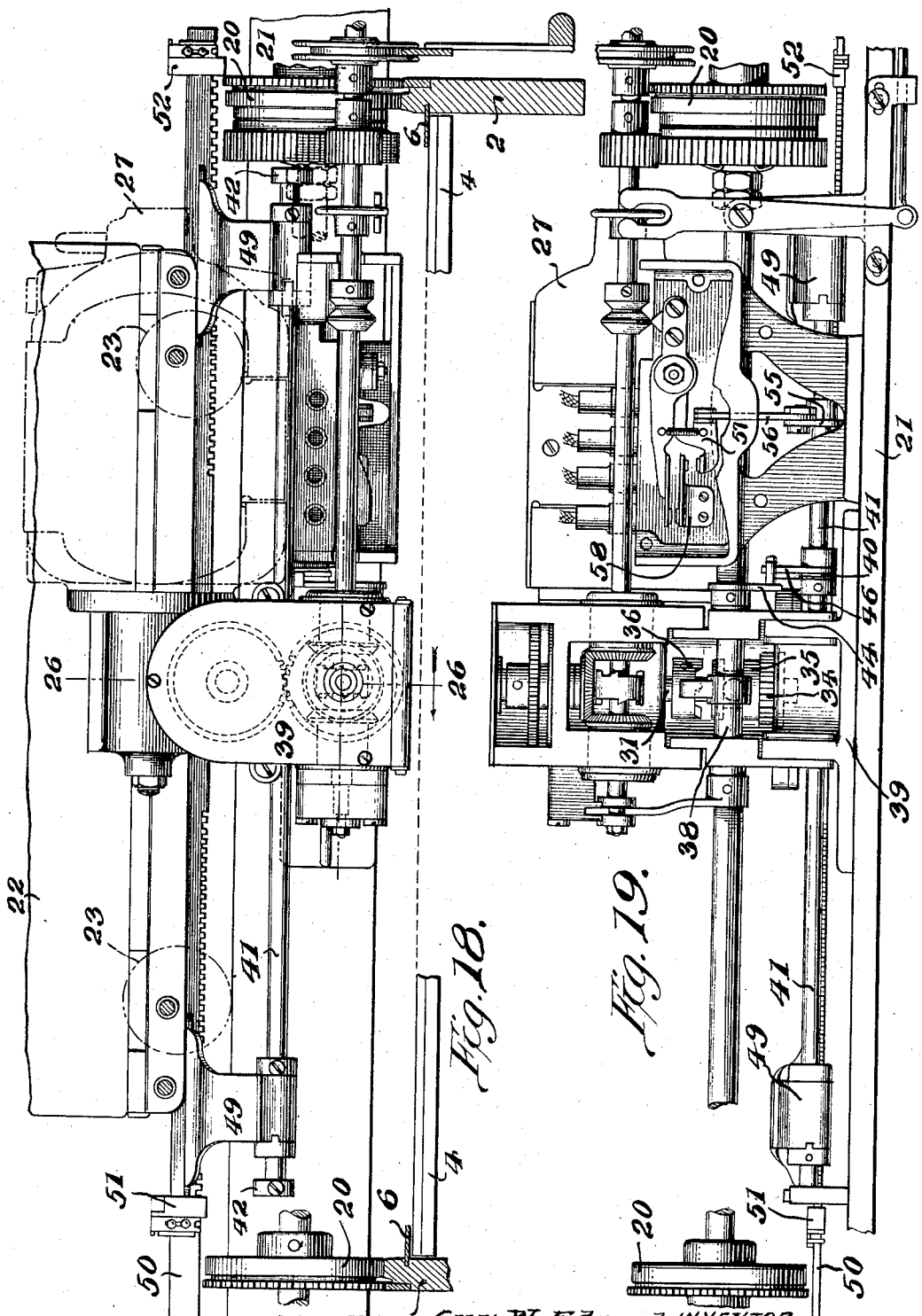

April 4, 1939.　　　G. W. EDMUNDS　　　2,152,841
WRITING MACHINE
Filed June 13, 1936　　　12 Sheets-Sheet 11
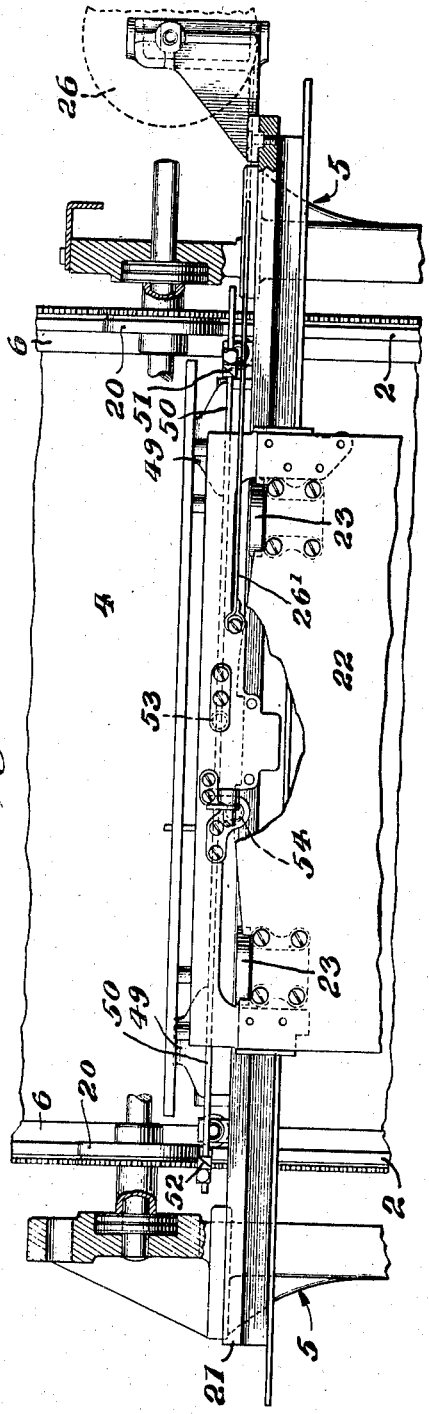
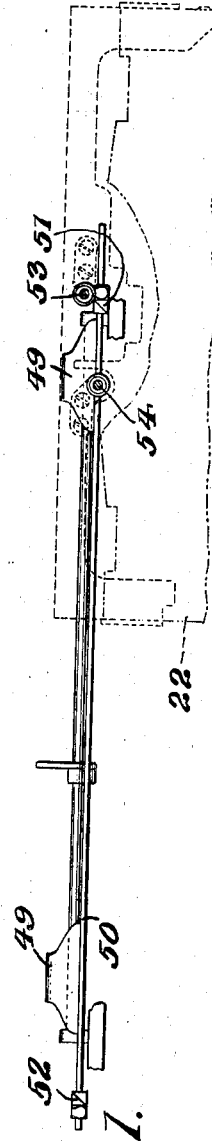
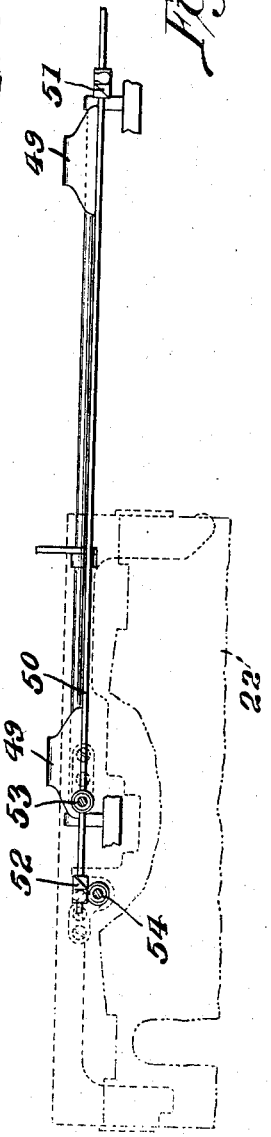
INVENTOR
Guy W. Edmunds,
BY
L. J. Julihn
ATTORNEY

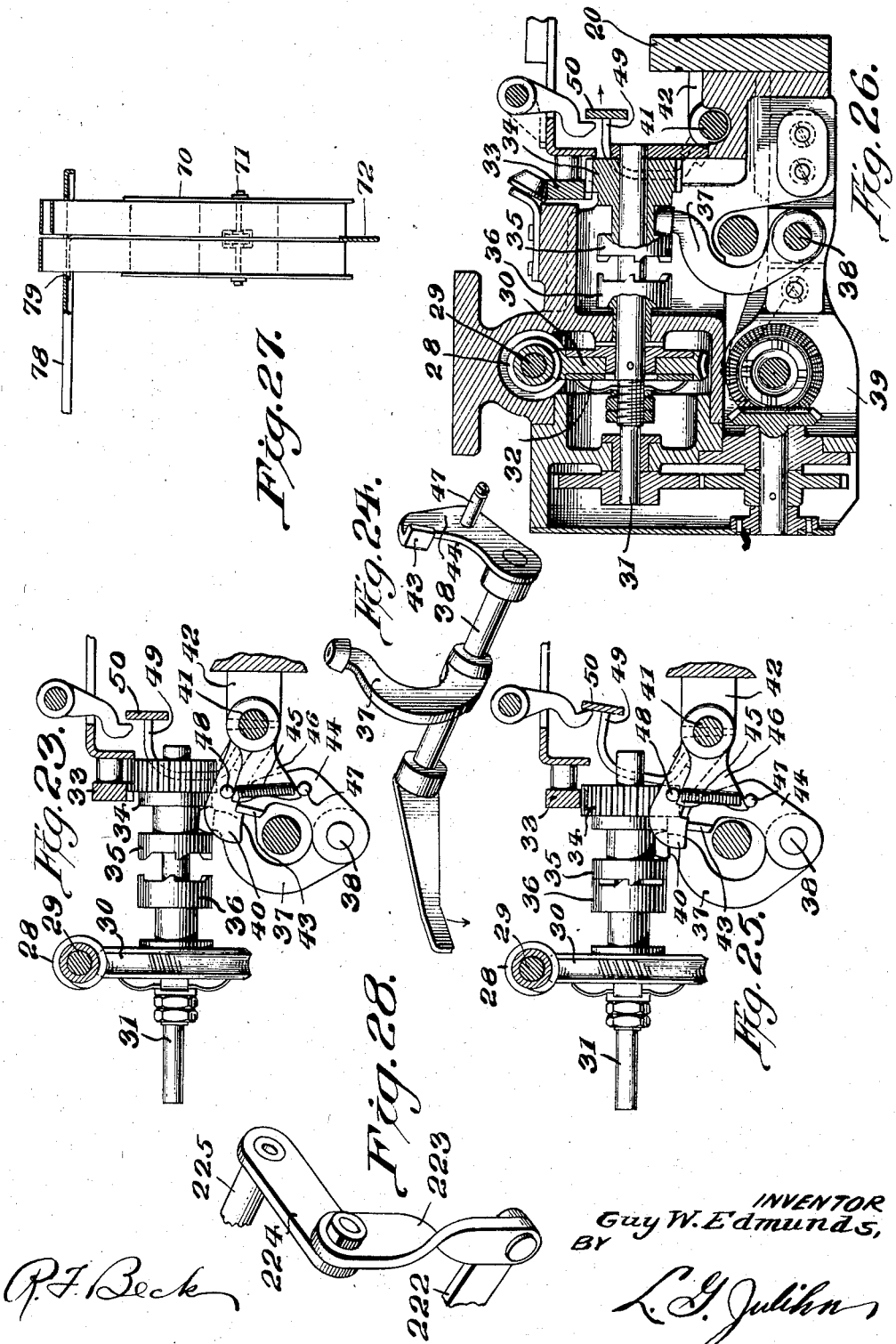

Patented Apr. 4, 1939

2,152,841

UNITED STATES PATENT OFFICE 2,152,841

WRITING MACHINE

Guy W. Edmunds, St. Louis, Mo., assignor to Underwood Elliott Fisher Company, New York, N. Y., a corporation of Delaware Application June 13, 1936, Serial No. 85,020

39 Claims. (Cl. 197—133)

This invention relates to writing machines, and is more particularly directed to machines for typing upon work strips.

Heretofore, it has been customary to equip machines of this class with work strips which either pass around a cylindrical platen, or lie across a flat platen in position to be typed.

In cylindrical platen typewriting machines, these strips have been held in place on the platen, by the usual pressure rolls, the strip being advanced in line spacing direction through operation of the usual line-space mechanism for turning the platen and pressure rolls.

In flat-platen typewriting machines, the work strip is led across the platen from a supply roll journaled parallel with one side of the platen, the strip being held in typing position by being clamped between the side margins of the platen and the usual platen ledges.

Movement of the platen away from the clamping ledges or shoulders releases the work strip for manual advance, to position a blank portion of the strip over the printing area of the platen.

In some instances, the work strips have been transversely perforated in spaced relation to enable the leading end of the strip after being printed, to be torn off to form a tag or separate work piece, instead of winding the printed portions of the strip on a rewind roll.

One object of the present invention is to facilitate the advance of the work strip across the platen, subsequently to typing thereon, to which end there is provided automatic means to advance the work strip step-by-step, which displaces the printed portion of the strip relatively to the printing area and positions an adjacent blank portion of the strip at the printing area.

Another object of the invention is to guide the strip across the printing area to insure proper tracking and positioning of the strip relatively to the printing area, and in conjunction with the clamping means, to retain the strip against movement in any direction during the typing operation.

It is desirable, in some instances, to provide one or more duplicates of the printed portions of the work strip, to which end, two or more strips can be led in superposed relation through the guide means across the platen, a manifolding strip being arranged to pass between the superposed strips and preferably transversely thereof. In such event, the guide means operates to retain the strips in register during their travel.

In the present instance, the manifolding material may also serve as a record of the indicia typed on the work strips, the supply of record material being wound on a re-wind spool.

Heretofore, when the manifolding material is used solely for duplicating the printed matter on the subjacent strip or strips, it is customary to advance the manifolding material only after the imprints made therefrom became too dim and indistinct.

When utilizing the manifolding material also as a record strip, however, it is necessary to advance the manifolding material during the interval after that portion of the work strip lying in the printing area has been printed upon, and before printing upon the adjacent blank portion thereof.

Therefore, another object of the invention is to provide for the step-by-step feed of the manifolding material in such manner as to insure or enforce the occurrence thereof.

A related object is to effect the step-by-step feed of the manifolding material as an incident to the feed of the work strips transversely thereof.

A further object is to effect the positive advance of the work strip step-by-step automatically, to displace the printed section of the work strip from the printing area and replace it with the next adjacent blank portion of the work strip.

In the particular embodiment selected to illustrate the invention, the work strip is intended to be separated into independent work pieces constituting tags for attachment to various kinds of goods, for shipping or other identification, and to facilitate this and other uses, the work strip is provided with holes, perforations or eyelets arranged equidistantly longitudinally of the work strip.

In carrying out the last-mentioned object, the advance of the work strip is caused to occur incident to the return of the letter-spacing carriage of a flat-bed typewriting machine of the well-known Elliott-Fisher style, to the beginning of a line, draft means being provided to enter the appropriate eyelet and advance the leading end of the strip so as to displace the printed portion or section of the work strip from the printing area and substitute a blank portion or section therefor, coincidently with the return of the carriage.

The draft means automatically releases from the eyelet as the carriage commences its travel in letter feeding direction.

In this connection, another object of the invention is to insure an effective engagement of the draft means and the work strip, to which end, the support or platen over which the work strip travels, is recessed at the point of engagement of the draft means with the work strip to enable the draft means to pass through the eyelet.

Another object of the invention is the provision of novel and effective means to sever the printed portions of the work strip to form individual work pieces or tags.

A further object of the invention is to provide novel means to adjustably latch the printing members and platen against movement in line spacing direction or return, means being provided to release the latch when it is desired to write on another line.

Another object is to effect such a timing relation between the feed of the work strips and the severance of the printed end thereof, that the latter operation can only occur after the work strip has been fed to advance the printed end beyond the printing area and locate an adjacent unprinted portion at the printing area.

The carriage return is effected automatically, the feed of the work strip occurring incident thereto and concomitantly therewith.

The clamping and releasing of the work strip, as well as the feed thereof, are under control of the operator, and the feed of the manifolding and record strip, as well as the operation of the severing means is dependent upon the operation of the clamping and releasing means.

To these and other ends, the invention includes novel features and combinations of parts, all of which will be more fully disclosed hereinafter and particularly pointed out in the claims.

In the accompanying drawings,

Fig. 1 is a front view of the well-known Elliott-Fisher writing machine, equipped with one embodiment of the invention;

Fig. 2 is a side view, partly in section, taken from the left side of the machine;

Fig. 3 is a fragmentary perspective view of a flat platen equipped with means to guide the work strip thereacross, and illustrates one means to advance the work strip, and releasable locking means to hold the parts in either of two line space positions;

Fig. 4 is a vertical sectional view through the flat platen, showing a single reach of work strip extending thereacross, the extreme leading end of the work strip lying adjacent the severing mechanism, and its driving means;

Fig. 5 is a detail vertical sectional view, taken at right angles to Fig. 4, showing the spring-pressed toggle mechanism for the platen;

Figs. 6 and 7 are views in side elevation and in perspective, respectively, of the severing mechanism;

Fig. 8 is a view in perspective of the operator's control mechanism for the driving means of the strip-feeding and strip-severing devices;

Fig. 8a is a sectional view of a Veeder-Root or similar rotary switch mechanism;

Fig. 9 is a vertical sectional view through the drive mechanism for the severing device;

Fig. 10 is a detail vertical sectional view longitudinally of the machine, showing the means to retain the line-spacing frame in either of two adjusted positions;

Fig. 11 is a detail side view of a form of strip-advancing or feeding mechanism;

Fig. 12 is a detail perspective view of a release slide used in connection with the feed finger of the feed mechanism;

Fig. 13 is a detail perspective view, partly broken away, of the carriage return drive mechanism, and the electric circuit present in a typical Elliott-Fisher machine;

Fig. 14 is a fore-and-aft sectional view of the manifold and record strip mechanism, also showing the work strip guides in cross-section;

Fig. 15 is a fragmentary plan view, partly in section, showing the relation of the work strips and the manifolding and record strip on the platen, the work strips being broken away to show the combined guide and guard means for the record strip;

Fig. 16 is an enlarged fragmentary sectional view on line 16—16 of Fig. 15, showing the record strip protective guiding means in operation;

Fig. 17 is a similar view on line 17—17 of Fig. 15, showing superposed work strips with the interposed manifolding and record strip, and the manner of engagement of the feed or draft means with the work strips;

Fig. 18 is a rear view of a part of the travelling printer carriage and line space frame;

Fig. 19 is a bottom plan view of the mechanism shown in Fig. 18;

Fig. 20 is a top plan view of a part of the travelling printer carriage, and line space frame, parts being broken away, and omitted, showing the control by the carriage, of the automatic carriage return mechanism;

Fig. 21 is a detail top plan view of the carriage return bail and the shifting means therefor, in the positions assumed at the beginning of the carriage return travel;

Fig. 22 is a similar view, the parts being in the positions assumed at the end of the carriage return travel;

Fig. 23 is a detail side view of the automatic carriage return clutch, and associated parts, in normal position;

Fig. 24 is a detail perspective view of the carriage clutch control shaft, and its arms;

Fig. 25 is a detail side view of the automatic carriage return clutch, and associated parts, in their operative positions;

Fig. 26 is a vertical sectional view of the clutch drive, taken on line 26—26 of Fig. 18, looking in the direction of the arrow;

Fig. 27 is a detail sectional view of a double spool or rest for the work strips; and Fig. 28 is a detail perspective view of a part of the linkage for actuating the manifold and record feed mechanism.

General description

The writing machine with which one embodiment of this invention is associated, is the well-known Elliott-Fisher, a modern form of which is disclosed in U. S. patent to Foothorap, No. 1,904,127, issued April 18, 1933.

Such a machine includes a pedestal or standard 1, (Fig. 1), supporting at its upper end a rectangular platen frame, composed of side bars 2 and end bars 3, (Fig. 4), enclosing a horizontal flat platen 4 adapted for limited vertical movement relatively to the frame.

The side bars 2 of the frame constitute rails for a line space frame 5, (Fig. 1), the rails each having an inwardly projecting ledge or paper clamp 6, (Fig. 4), with which the marginal side edges of the platen 4 contact to limit the upward travel of the platen and to hold the work in place.

Platen shift

The platen 4 is supported on pairs of toggle members 7 pivoted at 8, (Figs. 4 and 5), to the inner faces of the side bars 2, corresponding levers of the opposed toggle members being connected by springs 9 which operate upon their toggle levers to press the platen upwardly into contact with the platen-arresting and work-clamping ledges 6.

A link 10, (Figs. 1, 4, 5 and 8), connects the rear end of the usual foot-operated pedal 11 pivoted on a cross rod 12 of the pedestal 1, with a rocking bail 13, the arms of which are fulcrumed intermediate their ends on a cross bar 14 carried by one pair of the toggle members 7, the free ends of the bail arms 13 extending beneath and fulcruming on the pivots 8 of the opposed toggle members 7 at the front of the machine, for controlling the raising and lowering of the platen 4, as more fully shown and described in U. S. patent to Foothorap, 1,596,420, August 17, 1926, to which reference may be made for a more complete disclosure.

Pressure on the foot pedal 11 operates through the pedal link 10 and bail 13, to straighten the toggles, further tension the springs 9 and draw downwardly the platen 4, away from the paper clamping ledges 6.

Release of pressure on the pedal enables the springs 9 to restore the platen to its normal position, against the paper clamping ledges 6 and with its upper face within the range of the type bars hereinafter referred to.

Key carriage

Front rolls 19, (Fig. 2), and rear rolls 20 on the line space frame 5 support the latter on the side rails 2 of the pedestal, for back and forth travel along the rails.

This line space frame extends some distance to left and right of the side rails 2, the parallel front and rear cross bars 21 of the frame constituting a track traversed by the printer or key carriage 22 equipped with front and rear wheels 23 in rolling contact with the front and rear track bars 21, as shown in Fig. 1.

The keys of the keyboard 24 mounted in the carriage 22, each operate an individual linkage connecting the respective key levers with their appropriate down-strike type bars 25, to enable the writing or printing to be effected on work material supported on the platen.

The printer carriage 22 is advanced in letter spacing direction by the usual escapement mechanism, such for instance, as that illustrated in U. S. patent to Foothorap, No. 1,203,519, issued October 1, 1916, including the customary spring barrel 26, (Figs. 1 and 20), and flexible tape 26'.

Automatic carriage return mechanism

Means, such as illustrated in U. S. patent to Foothorap, 1,904,127, issued April 18, 1933, is provided to effect the automatic return of the carriage 22 to the beginning of a line at the left hand margin of the work.

Reference is made to the last-mentioned patent for a more complete exposition of the mechanism for obtaining this result, it being sufficient to state herein that a carriage return motor 27, (Fig. 2, in full lines and Figs. 16 and 18 in dotted lines), is suitably mounted at the rear of the line space frame 5 behind the printer carriage 22. A worm 28, (Figs. 13, 23, 25 and 26), on the armature shaft 29 of the motor, meshes with a worm wheel 30 on a carriage-return shaft 31. A suitable friction clutch 32 may be interposed between the worm wheel and carriage return shaft.

The forward end of the carriage-return shaft 31 extends beneath a carriage return rack 33 mounted on the carriage 22, a wide pinion 34 being journaled on the carriage-return shaft for limited axial movement relatively thereto and to the rack 33.

A clutch member 35 sleeved to the drive pinion 34 normally lies out of engagement with a coacting clutch member 36 fast on the shaft 31.

The free end of a clutch shifting arm 37 lies in a groove formed in the connecting sleeve between the clutch and pinion, the arm 37 being fast on a clutch-control shaft 38, suitably journaled in the motor gear casing 39 (Fig. 26), said arm being held in position to maintain the clutch member 35 apart from its coacting clutch member 36, by a spring-pressed latch 40 loosely mounted on a latch-control shaft 41 journaled in brackets 42, (Figs. 23, 25 and 26), projecting rearwardly from the rear face of the rear track bar 21. The free hooked end of the latch 40 takes over a lip 43 on a keeper arm 44 fast on the clutch control shaft 38, a spring 45 connecting the latch 40 and keeper arm 44.

The free end of a release arm 46 fast on the latch-control shaft 41 is interposed between the spring anchor studs 47 and 48 on the latch 40 and keeper arm 44, respectively.

To enable the carriage 22 to automatically control the carriage-return clutch mechanism, the upper ends of bail arms 49 fast upon and projecting upwardly from the latch-control shaft 41, support a universal bail 50 which, at its opposite ends, carries cam members 51 and 52 individually adjustable along the bail, and lying in the paths of tappets 53 and 54, (Figs. 20, 21 and 22), depending from the rear of the carriage 22.

The cam members 51 and 52 lie in line with each other, with their inclined faces in parallel planes. The carriage tappets 53 and 54 are slightly offset relatively to the universal bail 50 and are spaced apart.

As the carriage approaches the end of its travel, under the influence of the escapement spring barrel 25, (Figs. 1 and 20), after the printing of the final character, the leading tappet 53 contacts the inclined face of the right hand cam member 51, and rocks the latter, together with the universal bail 50, latch control shaft 41, and release arm 46 clockwise, (Figs. 13, 23 and 25), to cause the release arm to disengage the latch 40 from the keeper 44 and free the clutch-control shaft 38 to the action of the sprint 45, which has been further tensioned by the latch in its clockwise travel, whereupon the spring 45 rocks the clutch-control shaft 38 and shifter arm 37 counter-clockwise to engage clutch member 35 with its co-acting clutch member 36, thus completing the mechanical drive connections between the motor armature shaft 29 and the carriage 22.

The lip 43 of the keeper 44 passes beneath the bill of the hooked latch 40 as the clutch-control shaft 38 rocks counter-clockwise, to hold the universal bail 50 in substantially the position to which it has been rocked by the tappet 53.

Simultaneously with the release of the latch 40, the latch-control shaft 41, through an arm 55 (Fig. 13) fast thereon, and a link 56 connected to the arm, operates a switch arm 57 to complete a circuit through the motor 27, whereupon the latter is energized to drive the carriage-return gear train heretofore set forth, and return the carriage to position to print at the left hand margin of the work, all as set forth in the above-mentioned Patent No. 1,904,127.

As the carriage reaches the end of its return travel, the then leading tappet 54 wipes over the inclined face of the left hand cam member 52, which has been shifted into the path of travel of the tappet 54 by the previous action of the tappet 53 on the universal bail 50, and rocks the universal bail rearwardly, (Figs. 20–22), thereby interrupting the motor circuit, and disengaging the clutch members 35, 36, the rearward rocking of the universal bail 50 operating to position its right hand cam member 51 in the path of the carriage tappet 53, preparatory to the next traverse of the printer carriage 22 in letter spacing direction.

The foregoing is old in the art and constitutes a part of this invention only insofar as it is combined therewith to obtain the novel results hereinafter set forth.

In adapting a machine of the flat platen type to print on a work strip, it is desirable First, to provide a work strip supply and arrange that the strip be guided across the platen in a fixed path, and held against displacement, during the printing operation;

Second, to provide means to release the strip for displacement and then feed or advance the work strip, whereby to displace the leading end of the strip, after being printed, from the printing area, and to bring an unprinted reach of the strip over the printing area, to be printed upon;

Third, to provide means to sever the printed leading end of the work strip subsequently to its displacement, and stack such severed ends or work pieces;

Fourth, where a plurality of superposed strips are to be fed across the platen, to provide a manifolding means, which in the present instance, may also be a record means, an intermittent feeding device for the manifolding means being provided; and Fifth, where it is desired to so restrict the usual printing carriage travel in line spacing direction, as to print a single line of indicia on the work strip, to provide means to retain the printing carriage in any one of several adjusted positions.

In connection with the last-named novel feature of this device, it is desirable that means be provided to disable the strip feeding or advancing mechanism preliminary to the adjustment of the printing means to another line position.

Obviously, the severing means could be disabled or omitted were it not desired to separate the printed portions of the work strip into work pieces, and in cases where it is desired to write successive lines of characters on work sheets, the printing carriage locking means could be omitted.

With the foregoing understanding, the present embodiment of the invention, as shown in Figs. 1 and 27, discloses a reel 70 removably mounted upon an axle 71 projecting from a standard 72 connected to the right side of the pedestal 1 and offset therefrom.

In the present instance, this is a double reel, the standard 72 extending upwardly between the heads of the reel to form a central partition separating two rolls or supplies of work strips coiled thereon.

The foremost supply comprises a plurality of intercoiled work strips 74, 75, the rear supply consisting of a single coil 76.

As the machine is particularly intended to print upon tag material, the strips are each provided with the usual tag eyelets 77 equidistantly spaced, as shown in Figs. 3, and 14 to 17.

Where the tag material is intercoiled, it is highly desirable that the eyelets 77 lie in register when the superposed strips are fed across the platen, as in Fig. 17.

Obviously a single strip could be fed across the platen in place of the superposed strips, and similarly the rearmost work strip roll, could be formed of intercoiled strips, the two forms being shown for convenience in bringing out this fact, and also the adjustment of the printing mechanism relatively to two or more parallel lines of strips arranged across the platen, as will be hereinafter set forth.

The reel 70 lies beneath and is protected by the usual right hand shelf 78 of the pedestal 1, the work strips being conveniently threaded through a slot 79, (Fig. 15), in the shelf 78 and thence through a slot 80, (Figs. 3 and 4), formed in the right hand side rail 2, then across the platen 4 and through a similar slot 81 in the left hand side rail 2.

These slots 80 and 81 are located in a horizontal plane just below the clamping ledges 6, and are normally concealed by the side edges of the platen 4 when in its raised position, and uncovered when the platen is in its lowered position.

Obviously, the work strip is threaded through the slots 80, 81 when the platen is lowered, and upon its return to normal raised position, the platen presses the work strip against the under faces of the paper-clamping ledges 6 to hold the strips against movement.

It is, however, advisable to confine the reach of strip extending across the platen, to a predetermined path, to which end, guides 82, (Figs. 3, 14 and 15), of any suitable construction, as in the form of flat, narrow metallic ribbons secured by suitable fastenings, as screws 83, are arranged across the face of the platen in line with the slots 81, 82, spacers 84 being provided to support the guides above the platen surface in position to overhang the edges of the work strip and prevent it from wrinkling, curling or otherwise distorting.

In the form shown, three such guides 82 are provided in parallel relation to serve two lines of work strips placed side by side, the central guide serving to confine the adjacent edges of two lines of strip material.

Strip feeding or advancing

As one means to impart an automatic step-by-step feed to the work strip, it has been found convenient to utilize the carriage return mechanism, it being obvious that the same principle could be used solely for the purpose of feeding the work strip, were it not desired to effect the automatic return of the carriage.

To this end, a bracket 90, (Figs. 3 and 11), is secured to and projects from the usual type bar segment 91 with which the printer carriage 22 is equipped.

A dog 92 pivoted at 93 intermediate its ends to the bracket 90, is normally held by a spring 94 with its toothed end in yielding contact with the surface of the eyeleted work strip, over which the dog extends in parallel relation and in line with the longitudinally extending series of eyelets 77 of the work strip.

The leading edge of the tooth of the dog is curved, as at 95, so as to ride or cam itself out of the eyelets as the printer carriage 22 travels from left to right in the process of writing the desired indicia on the particular section of the work strip positioned at the printing area, the point of the tooth then contacting the unperforated portion of the work strip between the eyelets and trailing over the work strip as the line of characters is printed by the operator through depression of the selected keys 24 of the keyboard.

The usual margin determining carriage stops 96, (Fig. 1), on the letter spacing rack 97 are adjusted to confine the travel of the printer carriage 22 to a distance substantially equivalent to the distance between the equally spaced eyelets 77 of the work strip, and thus define the printing area.

The carriage-controlled cam members 51 and 52, (Figs. 20-22), are similarly adjusted along their supporting bail 50, to be operated upon by the carriage tappets 53 and 54 as the carriage reaches the opposite limits of its travel set by the carriage stops 96.

Assuming the printer carriage 22 to be in its extreme left hand position in readiness to traverse that section of the work strip positioned at the printing area, the feeding or draft dog 92 lies in engagement with the eyelet 77 adjacent the left hand rail 2, as shown in Fig. 3, with the point of its tooth resting on the surface of the platen.

As the carriage 22 begins to move to the right, under the influence of the usual power barrel 26, due to the release of the customary letter space escapement mechanism, through depression of the character keys 24, or of the tabulating of the carriage release keys 98 or 99, (Fig. 1), and more clearly shown in patents to Foothorap, 1,203,519, October 31, 1916, and 1,280,697, October 8, 1918, the curved or cambered edge 95 of the tooth is pressed against the circumferential wall of the eyelet 77 and rides out of the eyelet.

At the completion of the entry, the printing point of the printer carriage, which point at the start of such entry, was located adjacent the dash line marked "a" in Fig. 3, has advanced to proximity to the dash line marked "b" in such figure. The space occupied by successive entries may vary slightly in length while the predetermined printing area remains fixed in correspondence with the distance between successive eyelets 77. Consequently, if the printed line falls short of such correspondence the carriage must be tabulated until the leading carriage tappet 53 can wipe over the cam 51 to set the automatic carriage return mechanism, heretofore explained, for operation.

Likewise, since the length of the printing area, the length of carriage travel, and the distance between successive eyelets 77 are directly related, it is necessary that the carriage complete its full traverse at each entry, to insure that the feed or draft dog 92 may enter the succeeding eyelet, at the right hand limit of the printing area.

Upon the arrival of the printer carriage at the limit of its advance towards the right, the feed dog 92 which has trailed over the work strip during such advance, drops into the succeeding eyelet 77, substantially coincidently with the closing of the carriage return clutch 35, 36, (Figs. 23-26), and the closing of the switch contacts 57, 58, (Fig. 13).

To insure an adequate engagement of the feed dog 92 with the eyelet, which is that one just to the right of the dash line "a" in Fig. 3, the platen 4 is preferably recessed, as at 100, (Figs. 15 and 17), so that the point of the tooth of the dog may pass entirely through the eyelet, the left hand wall of the recess being inclined, to allow the point of the tooth to ride up onto the platen during its leftward travel, while engaged with the eyelet.

It will be remembered that, so long as the platen 4 is in its elevated position, it clamps the work strip between itself and the paper clamping ledges 6. Therefore, before the carriage 22 is permitted to return, during which return the abrupt face of the tooth of the dog 92 engages in the wall of the eyelet 77, to draw the work strip leftwardly with the carriage, whereby to remove that section of the strip bearing the last-printed item from the printing area, and substitute an unprinted section therefor, drawn off of the reel 70, it is necessary to release the paper clamping means to free the work strip so that it may be fed or advanced leftwardly.

This release of the paper clamping means is effected by the operator, who will rock the foot treadle 11, (Figs. 1, 4 and 8), to depress the platen against the tensions of the platen restoring springs 9 in the usual manner.

And in order to place the final determination of the time of return of the carriage, under the control of the operator, the motor circuit of U. S. Patent No. 1,904,127 is modified by the introduction therein of a second normally-open switch.

Thus, the patent shows a suitable connection, as a plug 110, (Fig. 13) with a source of power, one lead 111 extending from the plug 110, through certain releasable jacks 112, not necessary to explain as they form no part of the present invention, to the carriage return motor 27, thence to the fixed contact 58 of the normally open make and break switch 57, 58. From the shiftable contact 57, the power is led by conductor 113 through other jacks and thence to a speed-controlled rheostat 114, from which it is led through a normally closed safety switch 115.

In the above-mentioned Patent 1,904,127, the current passed from the safety switch back to the source through a main switch 206, 207, 208 corresponding to main switch 116 of the present invention, but in the present instance, the return lead 117 is modified by the introduction of a normally-open rotary make-and-break switch 118 of the well known Veeder-Root type, (see Figs. 2, 8, 8ª and 13), bolted to the pedestal 1, as shown in Fig. 2. The operating arm 119 of the switch 118 is connected by a link 120 with an arm 121 fast on a transverse shaft 122 suitably journaled in the pedestal 1, and extending adjacent the platen-depressing link 10, the operation of which, it will be remembered, is controlled by the operator.

A second arm 123 fast on the shaft 122, is slotted near its outer end, as at 124, to embrace a stud 125 projecting from the platen-depressing link 10.

Thus, it is obvious that even though the printer carriage 22, by its leading tappet 53, (Figs. 20-22), has operated the clutch-control bail 50 to close the carriage-return clutch 35, 36, (Figs. 23-26), and the carriage-return switch 57, 58, (Fig. 13), in the motor circuit, the carriage is not returned until the operator depresses the pedal 11 and platen-depressing link 10, to release the clamping action of the platen 4 on the work strip, whereupon, as an incident to such depression of the link 10, the stud 125 thereon rocks the arm 123, shaft 122, arm 121, link 120, and arm 119 of the manually-controlled switch 118, to close the latter, thus completing the motor circuit.

The rotary switch 118 is so arranged, as shown in Fig. 8ª, that the contacts are not closed until near the end of the travel of the switch arm 119, thus insuring the release of the clamping action on the work strip prior to the energization of the carriage return motor.

The motor, once energized, acts with such speed to return the carriage to the left hand end of its travel, and the distance traversed by the carriage is so short, as to render it practically impossible to interrupt the carriage-return circuit by relieving pressure on the pedal 11, until the carriage has completed its return, and itself, interrupted the circuit through the opening of the switch 57, 58 by the action of its tappet 54 on the clutch bail 50.

Obviously, as the carriage 22 returns to the beginning of a line, the feed dog 92 travels therewith and because of its engagement with the eyelet 77 into which it dropped at the end of the advance of the carriage, it draws with it the work strip to displace the last printed portion thereof from the printing area and substitute an unprinted portion therefor, drawn from the reel 70.

The pedal 11, when released by the operator, enables the springs 9, (Figs. 4 and 5), to raise the platen 4, which again clamps the work strip or strips between itself and the ledges 6.

The platen on its return to its normal raised position, draws with it the link 10 which reversely rocks the arm 123, shaft 122, arm 121, link 120 and switch arm 119, to separate the contacts of switch 118 and interrupt the motor circuit at this point. The carriage being now at the beginning of a line, the parts are ready for the typing of another entry on the succeeding tag.

Severing mechanism

The printed portions of the strip could be rewound on a receiving spool, if desired, but in the instant illustration, severing means is provided to separate the several successive entries into eyeleted tags for attachment to the goods manufactured by the owner of the machine, for example.

The particular machine on which this application is based, is used for the production of tags attachable to castings and other foundry products, a running record of the entries on the various tags being kept, as hereinafter set forth.

The leading end of the tag material or work strip, after being drawn across the platen and passing through the egress slot 81, (Figs. 2 and 4), is led through a slit 130, (Figs. 1, 2, 4 and 6), in a stationary shear blade 131 fastened at its opposite ends to a shear frame formed of a pair of bowed or U-shaped angle irons 132 arranged in parallel relation and secured at their ends to the left side of the pedestal 1.

The stationary shear blade 131 is slightly lower than the egress slot 81 so as to enable the left hand end of the traveling line space frame 5 to clear the work strip, as shown in Fig. 1.

A base plate 133 supported by and bolted to the horizontal flanges of the lower arms of the bowed angle iron side pieces 131, (Figs. 4 and 6), carries pairs of spaced upstanding ears 134 on its upper surface in which is journaled a pintle 135 forming part of a rocking frame including vertical side pieces 136 and a cross brace 137, for supporting the movable blade 138 of the shear.

The lower ends of the sides 136 are conveniently embraced between the respective pairs of ears 134.

Pairs of opposed, bifurcated brackets 139 fastened to the inner faces of the vertical side pieces 136 by fastening means 140', (Fig. 7), passing into the legs of the brackets from the outer faces of the side pieces, carry rolls or other anti-friction devices 140 between which the side edges of the vertical stock 141 of the shiftable shear blade 138 are positioned and held against edgewise movement. The stock passes down through an opening in the base plate 133.

Hangers 142, (Fig. 7), secured to the lower opposed brackets 139, project inwardly close to and past the side edges of the stock and are provided with spaced ears to which are journaled rolls 143 adapted to embrace the stock 141 and, in combination with rolls 144 journaled on the upper pair of brackets, prevent in and out movement of the stock and its blade 138 relatively to the hinged shear blade frame 135, 136, 137.

Springs 145 connected to the upper ends of the side pieces 136 of the hinged shear blade frame, draw the latter inwardly to press the movable shear blade 138 yieldingly against the face of the stationary blade 131, and thus enable a shearing action between the blades.

Normally, the movable shear blade 138 lies in its lowered position with its upper cutting edge below the slit 130 of the stationary blade to enable the leading end of the work strip to be threaded through the slit and to advance beyond the slit as the work strip is fed step by step by the dog 92.

It is desired, however, to sever the protruding end of the work strip subsequently to each step by step advance thereof through the slit to which end, means, under control of the operator, is provided for actuating the movable shear blade prior to the next advance of the work strip.

A shear blade driving motor 150, (Figs. 1, 2, 4, 8 and 9), the gear casing 151 of which is mounted behind the stock 141 of the movable shear blade, on an angle iron 152 secured to the left side of the pedestal 1 and extending under the lower ends of the bowed angle iron members 132, rotates a worm 153, (Fig. 9), meshing with a worm gear 154 loosely mounted on the inner end of a driven shaft 155 journaled in the gear casing 151 at right angles to the motor. The outer end of the driven shaft 155 protrudes from the gear casing and carries a crank 156 connected by a link 157 to the lower end of the stock 141.

A clutch disk 158 fast on the inner end of the driven shaft, carries a spring-pressed clutch pawl 159 pivoted thereto, which pawl coacts with teeth 160 formed on the hub 161 of the worm gear 154, all as more fully explained in U. S. patent to Sundstrand, No. 1,925,735, issued September 5, 1933, to which reference is made for a more complete description of this portion of the invention, Fig. 9 of the present application corresponding with Fig. 5 of the Sundstrand patent above mentioned.

A latch 162 projecting through the gear casing, is contacted, normally, by the heel 163 of the clutch pawl 159, to hold the clutch pawl disengaged from the toothed hub 161.

Release of the spring-pressed clutch pawl 159 by the latch 162 enables the pawl to drop between the teeth 160 of the hub 161, whereby to enable the worm wheel 154 to drive the shaft 155 through the clutch disk 158 and rotate the crank 156 which, during a single cycle, imparts an upward movement to the shiftable blade 141, 138, to shear the leading end of the work strip protruding through the slit 130 in the stationary shear blade, after which the shiftable blade is returned to its normal idle position below the slit 130.

As it is desired to provide for but a single reciprocation of the shiftable blade, in the ordinary operation of the machine, means is devised which trips the latch 162 to enable its return to its clutch-arresting position in time to disengage the clutch pawl at the end of each cycle of operation.

The shear-actuating motor 150 is normally continuously rotating while the machine is in use, current being supplied thereto through the connections 164, 165, (Fig. 13), from the leads 111, 117 of the main circuit.

It is also desirable that the controls to be manipulated by the operator, be reduced to the lowest number, to which end I have arranged that the platen-depressing link 10, in addition to affording control of the platen, and the feed of the work strip shall control the severing operation. As one means to enable the link to effect this additional function, the link carries a plate 170, (Fig. 8), pivotally supporting a by-pass pawl 171, at 172, the forwardly projecting end of which pawl may be equipped with an anti-friction roll 173. A spring 174 connects the tail of the by-pass pawl 171 with one arm of a stop 175 rigidly secured in any suitable manner to the supporting plate 170, and having a laterally projecting lip 176 on its remaining arm lying in the path of, and normally contacted by a shoulder 177 on the by-pass pawl.

Conveniently, the stop 175 is rigidly mounted on the pivot 172 of the by-pass pawl, as by having a non-circular opening fitting over a correspondingly shaped part of the pivot.

The spring 174 normally holds the shoulder 177 of the by-pass pawl against the stationary lip 176, so that the by-pass pawl, as it travels up and down with the platen-depressing link 10, may traverse a path which intersects the projecting end of one arm of a bell crank 178 fast on a tripping cross-shaft 179 lying parallel with, and in advance of the switch control shaft 122, and journaled in the sides of the pedestal 1.

An arm 180 fast on one end of the trip shaft 179 is connected by a link 181 to one arm of an angle lever 182 pivoted at 183 on the gear casing 151, (see also Fig. 2), a second link 184 connecting the remaining arm of the angle lever 182 with one end of a latch-tripping lever 185, (Fig. 9), fulcrumed on a post 186 mounted in the gear casing 151 and pivotally connected at its opposite end to the upper end of the shiftable clutch-controlling latch 162, guided in a bushing in the gear casing.

A strong spring 187, (Fig. 8), anchored to the platen-depressing link 10 is connected at its opposite end to the remaining arm of the bell crank 178, and operates through the linkage just outlined, to shift the clutch-controlling latch 162 to, and maintain it in, its effective position.

It will be recalled that the operator, after completing an entry, depresses the treadle 11, and with it the link 10 and platen 4, to not only release the clamping action of the platen on the work strip, but also to complete the circuit through the motor 27 to energize the latter for effecting return of the carriage to the beginning of a line, the carriage, on such return, operating through the attached feed finger 92, to advance the work strip, to remove the printed section thereof from the printing area, and substitute an unprinted section at such area.

The work strip, when thus advanced, is protruded through the slit 130, (Figs. 4 and 6), a distance equivalent to the amount of feed imparted to the strip.

As this platen-depressing link 10 travels downwardly, the roller 173 on the end of the by-pass pawl 171, (Fig. 8), contacts and rides over the tappet arm of the bell-crank 178 without imparting any movement to the latter and the trip-shaft 179, because the return spring 187 is superior to the spring 174, and the by-pass pawl swings clockwise (in the figure), further tensioning the spring 174, which shifts the by-pass pawl 171 back to normal after wiping past the tappet arm 178.

This arrangement affords time within which to release the clamping action on the work-strip and to feed the work-strip.

Upon release of the treadle 11, the strong platen-elevating springs 9, (Figs. 4 and 5), assert themselves to return the platen 4 to clamping position and restore the link 10 and treadle 11 to normal. The link 10, as it is thus raised, causes the free end of the by-pass pawl 171 to take under the arm of the bell-crank tappet 178, (Fig. 8), the by-pass pawl, as it moves upwardly, being held against yielding by contact of its shoulder 177 with the lip 176 of the stop, so as to rock the bell crank 178, trip shaft 179, arm 180, link 181, angle lever 182, link 184 and latch lever 185, to lift the free end of the latch 162 away from the heel 163 of the spring-pressed clutch dog 159, whereupon the clutch-dog engages the continuously-rotating worm wheel hub 161, and through clutch disk 158, and counter shaft 155, imparts a cycle of operation to the movable shearing blade 138.

Contact of the roller-equipped end of the by-pass pawl 171 with the bell crank tappet 178 is but momentary, and upon the escape of the by-pass pawl, the return spring 187, which was further tensioned by the counter-clockwise rotation of the bell-crank 178 under the influence of the pawl, returns the train of linkage together with the clutch latch 162 to their normal positions.

The clutch dog 159 remains engaged with the toothed hub 161 of the worm wheel, however, until it has completed a single cycle sufficient to impart one complete reciprocation to the movable shear blade 138.

As the shear blade returns to its lowered position, the heel 163 of the clutch dog 159 will contact the end of the clutch-disengaging latch 162, assuming the latter has returned to its normal, effective position, to disengage the clutch, whereupon the shear blade 138 comes to rest.

As the work strip is advanced, its leading end enters the flaring mouth 190, (Figs. 1 and 4), of an inclined chute 191 having a re-entrant or tumbling bend 192, whereby the severed section, as it slides down the chute is reversed from a face-upward to a face downward position and thus deposited on the sloping block or bottom 193 of the chute opposite a door 194 affording access to the receiving compartment, the successive sections being arranged in the order of writing, and forming an inclined pile readily removable from the compartment as the door is opened.

The flaring mouth of the chute is arranged sufficiently closely to the shearing blades 131, 138 that the leading end of the work strip, which sags a little as it protrudes from the slit 130, has no difficulty in entering the chute, and the shearing operation serves to force the right hand end of the protruding section upwardly to tilt the section so that it will readily slide down the chute. A hinged hood 195 encloses the receiving end of the chute and the shear blades, for protection against accidents.

Recording and manifolding means

As one means to enable a record to be kept of the entries made on the severed sections of the work strip, and for manifolding purposes, as will hereinafter appear, there is provided a recording and manifolding tape 200, (Figs. 1-3 and 14-17), which may conveniently comprise a roll of carbon paper of a width to correspond with the printing area, as defined by the distance traversed by the printer carriage in printing an entry on the work strip.

The spool 201, (Fig. 14), on which the carbon tape or web is wound, is journaled on a cross rod 202 extending between the front ends of the side rails 2 of the platen frame, and held against endwise travel on the rod by suitable set collars 203 adjustable along the rod.

From this spool, the carbon tape is led upwardly over a suitably supported idler roll 204 to bring the tape into line with the upper face of the platen 4, and thence from front to rear of the platen, the tape being threaded beneath the guides 82 for the work strip, and at its rear end, the carbon tape passes over another suitably journaled idler roll 205, extending between the side rails 2 near their rear ends, from which it passes downwardly to a re-wind roll 206 frictionally engaging a cross shaft 207, which shaft is journaled at its opposite ends in hangers 208 depending from the lower edges of the side rails 2.

In that form of the invention herein shown, the carbon tape 200 passes carbon face down beneath the single ply of work strip 76 and between the superposed plies of work strips 74, 75, and to protect the right hand edge of the carbon tape from being damaged by the protruding eyelets 77 of the work strips, as well as to constitute a guide for the carbon tape, I arrange shields 209, 210, (Figs. 15-17), located in the paths of the eyelets 77, and centrally of the guide ribbons 82, on the leading-in side of the work strips.

Where there is but a single work strip, the offset shield 209, (Fig. 16), is sufficient to protect the edge of the carbon tape, the foot of the shield being fastened to the face of the platen in any suitable manner, but where the carbon tape passes between two plies of work strips, as 74, 75, each equipped with eyelets 77, it is necessary to form the shield of spaced arms mounted on a bridge piece 211 extending between and secured to the guide ribbons 82 between which the superposed work strips travel, to protect the edge of the carbon tape against damage from the eyelets in the upper and lower strips.

Obviously, if the work strips are not equipped with eyelets or other projecting devices, these shields 209, 210 could be omitted.

In order to impart a step-by-step advance to the combined manifolding and recording tape 200, so that it may serve to clearly record the several entries made on the work strip sections seriatim, and also present a fresh surface to the subjacent work strip, there is provided a line-spacing mechanism very like that shown in U. S. patents to Foothorap, No. 1,904,127, April 18, 1933, (Figs. 33-36 of the patent), and No. 1,275,413, August 13, 1918, the line-space adjustment being omitted for the sake of clearness.

A knurled wheel 220, (Figs. 2 and 14), fast on one end of the rewind roll shaft 207 is operated upon by a feed pawl 221 pivotally mounted at 230 on a pawl carrier arm 231 journaled on the rewind shaft 207. One arm of a line spacing bell crank 222, also journaled at its angle on the rewind shaft 202, lies parallel with the pawl carrying arm 231 and carries a pin 232 seated in a slot 233 in the outer end of the feed pawl 221. A link 223 connects the opposite arm of the bell crank 222 with a crank 224, (Fig. 28), projecting laterally from the rear end of a feed shaft 225 journaled in ears 226 depending from the lower edge of one of the side rails 2.

The feed shaft 225 lies parallel with the side rail 2, and carries a tappet arm 227, (Figs. 2 and 4), at its forward end, which arm lies in the path of travel of one of the toggle members 7, as shown in dotted lines in Figs. 2 and 4.

The toggle arm 7, under the influence of the operator's foot on the treadle 11, rocks downwardly to depress the platen 4, and in so doing contacts the tappet arm 227 and rocks the feed shaft 225, which, in turn, through the described linkage, rocks the line-spacing bell crank 222 against the tension of a suitably anchored return spring 228 connected to an eye on the hub of the line spacing bell crank 222, to rock the bell crank, and cause its pin 232 to first rock the normally-disengaged feed pawl 221 into engagement with the knurled periphery of the feed wheel 220 and then turn the wheel to reel the carbon tape 200 onto the rewind spool step-by-step.

The springs 9, upon release of pressure on the treadle 11, restore the toggle links 7 to their normal positions, thereby releasing the tappet arm 227, shaft 225, and bell-crank 222 to the action of the return spring 228, which restores the parts to their normal positions.

A resilient brake 240 acting upon the rewind shaft 207 or upon the rewound coil of carbon tape, tends to prevent over-rotation of the shaft 207 which would result in waste of the carbon tape.

The foregoing explanation has been mainly directed to a machine equipped for printing on a single work strip only, as 76, (Figs. 3, 4, 15 and 16), in which event a considerable space is left at the rear of the platen 4 for typing upon flat sheets, if desired, as such single work strip could be applied to a standard machine, omitting the automatic line spacing mechanism with which such a machine would ordinarily be provided.

It is clear, however, that a plurality of superposed work strips, as 74 and 75, (Figs. 1-3, 6 and 17), could be led across the machine, printed upon, severed and accumulated in separate receiving compartments, in place of, or in addition to, a single work strip, by the hereinbefore described mechanisms. In some instances, it is convenient to have a machine equipped with both single and superposed work strips, to enable the operator to readily and quickly shift from one strip to the other depending upon whether the tags are to be attached to single or duplicate parts, for instance, or for other good and sufficient reasons.

The strips 74 and 75 may be wound in intercoiled relation on the forward half of the reel or drum 70, as shown, the leading ends thereof being threaded through the slot 80, in the nearest side rail 2, led between the guides 82, respectively over and under the folded shield 210, and through the slot 81 in the opposite side rail 2, after which they are preferably threaded through separate slits 130, 130ᵃ, in the stationary shear block 131.

Preferably, also, where two or more work strips are utilized, the receiving device for the severed leading ends thereof, is formed with separate compartments, individual to each work strip.

Accordingly, there is shown, in the present instance, a receiving hopper separated by cross and vertical partitions 250 and 251, into four separate compartments, into three of which the respective leading ends of the work strips protrude from the slits 130, 130ª. The compartments are all similar so that the foregoing description of one will suffice for all.

In those instances where a plurality of working strips, as 74 and 76, are fed along separate tracks, it may be convenient to dispense with the usual line space frame feed, and provide means to positively lock the line space frame 5 in one or another of its positions suitable for printing on one or another of the work strips.

To this end, the rearward extension of the line space frame 5, (Figs. 2, 3 and 10), carries a cross bar 260 which, together with the rear rail 21 of the line space frame, support a horizontal plate 261 equipped with a vertical bushing 262 to accommodate a vertical bolt 263 pivotally connected to the forward end of a release lever 264 fulcrumed at 265 on a pillar 266 projecting upwardly from the platform 261.

The bolt 263 passes through the platform 261, its lower end being adapted to seat in one or another of a plurality of sockets 267 formed in a keeper plate 268 occupying a recess 269 in the platen 4, of such depth that the upper face of the keeper plate lies in the same plane with the upper surface of the unrecessed portion of the platen and somewhat longer than the plate 268. The keeper plate is slotted, as at 270, to accommodate suitable fastenings 271, and enable the adjustment of the keeper plate in its recess, so that when the lower end of the bolt 263 is seated in one or another of its sockets 267, the printing line of the printer carriage will register with the proper place on the corresponding work strip, the bolt operating to lock the printer carriage against movement.

To enable the printer carriage to be shifted, to bring the printing line thereof into registry with the desired workstrip, the rear end of the release lever 264 is connected by a link 272 with an arm 273 projecting from a cross shaft 274 journaled at its ends in the side walls of the rear extension of the line space frame, the shaft 274 also having a crank 275, connected by a link 276 with one arm of a bail 277 extending across the line space frame, the arms of the bail 277 being pivoted at 278 to the side walls of the rear extension of the line space frame.

This bail, (188, 184 of Patent 1,904,127,) is a well-known unit of the Elliott-Fisher machine, and has been adapted for use in the present invention as a part of the line space frame locking and releasing mechanism.

A key lever 279 (Figs. 2 and 3), pivoted intermediate its ends at 280 to the side wall of the printer carriage 22, carries a key 281 at its forward end, its rear end being connected by a link 282 to one end of an intermediate lever 283 pivoted to the rear wall of the printer carriage at 284 and carrying a finger 285 at its oposite free end, which finger extends over and travels with the printer carriage relatively to the release bail 277, as the carriage moves in letter-spacing direction and return.

A spring 286 connected to the key-lever 279 retains the key 279 and connected parts in, and returns them to, normal position, and a spring 287 anchored to the usual cross rod 288 on the rear extension of the line space frame 5 and connected to the release bail 277, operates to restore the bolt 263 to effective position in any of the sockets 267 with which the bolt is brought into registry.

Obviously, whenever the operator desires to write on either of the two lines of work strips shown in the drawings, he will depress the key 281, which will effect a clockwise rotation of the intermediate lever 283 to cause the finger 285 to rock the release bail 277, and through the thereto-connected linkage, to withdraw the bolt 263 from the particular socket 267 in which it is seated, after which the line space frame 5 with the printer carriage 22 mounted thereon, may be rolled along the side rails 2 on its wheels 19, 20, to position the printing line of the printer carriage over the desired work strip, whereupon the operator will release the key 281, to enable the spring 286 to return the key-connected parts to normal and free the release bail 277 for operation by the spring 287 which, through the hereinbefore described linkage, projects the bolt 263 into the socket 267 over which it has been positioned by the adjustment of the line space frame.

Provision must be made, however, to disable the feed dog 92 during the selection of the particular work strip upon which entries are to be made, otherwise the dog would contact the guide ribbons 82 during the shifting of the line space frame and printer carriage, resulting in damage to both dog and guides.

Conveniently, I make use of the key control of the line space frame locking mechanism, just explained, to disable the feed dog 92.

But because of the greater travel required of the lock, controlling key lever 279 to release the bolt 263 than is required to disable the feed dog 92, coupled with the fact that such excess throw, if communicated to the dog, would injure its spring 94, even if the dog was capable of being rocked an excess amount, which is unlikely, because the dog would contact the printer carriage frame, and thus prevent the release of the bolt 263, a compensating device is interposed between the key lever 279 and the feed dog 92, as follows:

It will be remembered that the dog 92 is pivoted at 93 to a bracket 90 attached to a part of the printer carriage, and that the spring 94 is connected to the tail of the dog to maintain its toothed end 95 in contact with the work strip.

A shank 290, (Figs. 2, 3, 11 and 12), depending from the forward end of the lock-releasing key lever 279, is slotted at its lower end, as at 291, to accommodate a stud 292 projecting from the tail of the feed dog 92, the stud normally occupying a position intermediate the end walls of the slot 291, Fig. 11.

A compensating slide 293 is held by slot-and-pin connections 294 and 295 to the lower end of the shank 290 for limited relative movement, the lower end of the slide conveniently, although not necessarily, being recessed, as at 296, (Fig. 12), to rest on the stud 292 of the feed dog, a spring 297 holding the slide 293 in yielding contact with the stud 292.

The dog 92 must be afforded sufficient play relatively to the shank 290, to enable the dog to freely rock through a distance limited by the lower edge of the compensating slide 293 and the lower end of the slot 291 in the shank, as the dog enters and rides out of the eyelets 77, and this is permitted by arranging that the compensating slide shall normally lie under the influence of its spring 297, with the upper wall of its slot 294 in contact with the upper guide pin 295 of the shank, as shown in Fig. 11.

Upon depression of the lock-controlling key 281 and key lever 279, the shank 290 is depressed, and the spring 297 advances the compensating slide 293 with the shank, such spring being superior to the spring 94 of the feed dog 92, so as to cause the slide to rock the dog counter-clockwise to its highest position due to contact of the lower end of the slide with the stud 292 on the tail of the dog.

The key 281 and its key lever 279 and shank 290 continue to descend, however, subsequently to the arrest of the feed dog 92 by contact of its toothed end with the type bar segment 91 of the printer carriage, until the key 281 has been fully depressed, the shank 290 being permitted by its slot 291 to shift relatively to the stud 292 on the feed dog, and the screws 295 of the shank traversing the slot 294 of the compensating slide 293 during such excess travel of the shank relatively to the feed dog.

Upon release of the lock-control key 281 and the return of the thereto-connected parts under the influence of the spring 286, the shank 290 is raised, the uppermost screw 295 thereof contacting the upper end of the slot 294 in the compensating slide 293 and raising the latter to tension the spring 297 and withdraw the lower end of the slide relatively to the stud 292 on the tail of the feed dog, thereby enabling the feed dog spring 94 to restore the feed dog to its normal position with its toothed end in contact with the new work strip.

It will be understood that the feed dog 92 is raised during the initial stage of the depression of the lock-controlling key 281, to a height sufficient to pass over the work-strip guides 82, and that after the bolt 263 is withdrawn from its socket, the line space frame 5 and carriage 22 can be shifted back and forth relatively to the platen 4 to position the printing line over the desired work-strip.

Of the superposed work strips, the lower strip may be of a different grade and thickness from the upper, as in one of the installations, where this invention is in use, and the work strips may have indications for the proper entries preprinted thereon, as shown.

Changes may be made in the form and arrangement of the several parts described, and certain of the mechanisms may be used to the exclusion of others, without departing from the spirit and scope of the invention.

What I claim as new, is—

1. In a writing machine for printing upon a work strip, the combination with a platen, and a group of selectively operable printing members relatively movable in letter spacing direction and return; of means to advance the work strip intermittently relatively to the printing area on the platen; means to sever the printed portions of the strip upon the advance of the strip beyond the printing area; a motor to drive the severing means; a normally idle clutch between the motor and the severing means; and means under control of the operator to release the clutch for operation.

2. In a writing machine, including a relatively shiftable group of selectively operable printing members, and a platen, the combination of means to intermittently feed a work strip to and past the printing area; and means to sever printed portions of the work strip subsequently to the passage of the strip past the printing area, including a stationary and a lineally movable blade; a swinging frame in which the movable blade reciprocates, and by which it is guided; means which presses the swinging frame and blade laterally towards the stationary blade to maintain a shearing relation; and a motor to reciprocate the movable blade relatively to the stationary blade to effect a shearing operation.

3. In a writing machine, the combination with a platen, a traveling carriage; an escapement means to feed the carriage in letter spacing direction; and power-driven means to return the carriage to begin a line of writing; of manipulative means to control the operation of the power-driven, carriage returning means; means to advance a work strip step-by-step, relatively to the platen incident to the return of the carriage to the beginning of a line, and another power-operated means under control of the manipulative means, to sever the leading end of the work strip subsequently to its advance.

4. In a writing machine, the combination with a platen, a traveling carriage; an escapement means to feed the carriage in letter spacing direction; and power-driven means to return the carriage to begin a line of writing; of manipulative means to control the operation of the power-driven, carriage-returning means; means to advance a work strip step-by-step, relatively to the platen incident to the return of the carriage to the beginning of a line; another power-operated means under control of the manipulative means, to sever the leading end of the work strip subsequently to its advance; an additional strip extending transversely relatively to the work strip; and means also controlled by the manipulative means to effect a step-by-step feed of said additional strip.

5. In a writing machine, the combination with a platen; and a key carriage, including a set of selectively operable keys and printing members to traverse the platen in letter spacing direction and return, and in line spacing direction and return; of means to latch the key carriage at any of several predetermined line space intervals; means to feed a work strip step-by-step across the platen; and means to render the work strip feeding means ineffective, and to release the latch to enable the carriage to be positioned at a different line space interval.

6. In a writing machine, the combination with a platen, and a key carriage having a set of selectively operable keys and printing members, to traverse the platen in letter spacing direction and return; of a feed finger carried by the key carriage and effective to advance a work strip in the direction of return of the carriage and coincidently with the return of the carriage to the beginning of a line, whereby to displace a previously printed section of the work strip from the platen, and feed an unprinted section to the printing zone.

7. In a writing machine, the combination with a platen, and a key carriage having a set of selectively operable keys and printing members, to traverse the platen in letter spacing direction and return; of a feed finger carried by the key carriage and effective to engage a work strip to advance the latter in the direction of return of the key carriage coincidently with the return of the carriage to the beginning of a line, the feed finger adapted for automatic disengagement from the work strip as the carriage advances in letter spacing direction.

8. In a machine for writing on work strips having spaced perforations, the combination with a relatively movable platen and a carriage; of means to feed a perforated work strip intermittently acros the platen, including a feed finger traveling coincidently with the carriage to enter successive perforations in the work strip as the carriage shifts in one direction, and to disengage itself from the perforations as the carriage starts its travel in the opposite direction.

9. In a machine for writing on work strips, the combination with a platen; of a work strip having spaced perforations; means to guide the work strip across the platen; and means entering the perforations successively to impart an intermittent feed to the work strip; the platen having a recess with an inclined wall, at a point with which the perforations in the work sheet successively register, to facilitate the effective engagement of the intermittent feed means with the work strip, and its ready disengagement from the recess.

10. In a machine for writing on work strips, the combination with a set of selectively operable printing members, and a platen relatively movable in letter spacing direction and return; of means to advance the leading ends of superposed work strips to and beyond the printing position, in successive steps; manifolding and record receiving means interposed between the work strips and traversing a path at substantial right angles to the work strips; feeding mechanism individual to the manifolding and record-receiving means; means operable to sever the leading ends of the work strips subsequently to printing thereon; and a single manually operable means to initiate the operation of the work strip advancing means, the severing means, and the feeding mechanism for the manifolding and record-bearing means.

11. In a machine for writing on work strips, the combination with a set of selectively operable printing members, and a platen relatively movable in letter spacing direction and return; of means to advance the leading ends of superposed work strips to and beyond the printing position, in succesive steps; manifolding and record-receiving material interposed between the work strips; feeding means individual to the manifolding and record-receiving material; and a control means to initiate the operation of the work-strip advancing means, and to operate the feeding means for the manifolding and record bearing material concomitantly.

12. In a writing machine, the combination with a set of selectively operable printing members arranged to print in a predetermined area on the work; of work-engaging means; the work-engaging means and work being relatively movable through a predetermined distance at the end of which relative movement the work-engaging means engages the work; means to return the work-engaging means to the opposite end of its travel, during which the work-engaging means advances the work; the work-engaging means arranged to automatically disengage itself from the work at the beginning of the next cycle of operation.

13. In a writing machine, the combination with a suitable support; a platen mounted in the support; and a frame, the platen and frame being relatively shiftable in line spacing direction; of a normally effective latch mounted on the frame to hold the platen and frame against any movement at any of several relatively adjusted positions; and manually operable means to release the latch to free the frame and platen for relative adjustment.

14. In a writing machine, the combination with platen and frame elements relatively shiftable in line spacing direction, and towards and from each other; of a latch and a keeper carried by the elements, respectively, to retain them where adjusted, the latch having sufficient length to maintain engagement with its keeper during the shifting of the elements towards and from each other, and means to release the latch.

15. In a writing machine, the combination with selectively operable printing mechanism to print on a work strip; of means to intermittently advance the work strip to and beyond the printing area; shearing bars between which the leading end of the strip passes subsequently to the printing operation; a yielding frame; a shear blade mounted to slide in the frame to co-act with the shearing bars; tensioned means to draw the shear blade towards the shearing bars; and means to operate the blade.

16. In a writing machine, the combination with selectively operable printing mechanism to print on a work strip; of means to intermittently advance the work strip to and beyond the printing area; shearing bars between which the leading end of the strip passes subsequently to the printing operation; a pivotally mounted frame; anti-friction devices mounted in the frame; a shear blade confined against edgewise and lateral movement by the anti-friction devices; means to reciprocate the shear blade; and means to maintain the shear blade and shearing bars in close contact.

17. In a writing machine, for printing on work strips, the combination with a motor in circuit with a source of power; a travelling carriage; normally disconnected drive connections between the motor and the carriage; carriage-controlled means to make and break the motor circuit, and to connect and disconnect the drive mechanism; and a work-clamping means; of a normally open switch in the motor circuit; a shearing mechanism for the work strips; a motor in circuit with the power source to operate the shearing mechanism; a switch in the last-named circuit; means operable coincidently with the return of the travelling carriage to impart a step by step advance to the work strips; and means to operate the work-clamping means and the respective switches in timed relation.

18. In a writing machine for printing on work strips, the combination with a group of selectively operable printing members; a travelling carriage; power-driven means to restore the travelling carriage to the beginning of a line; and a releasable work-strip clamping means to retain the work strip stationary in printing position against accidental displacement; of means operable concomitantly with the return of the travelling carriage, to intermittently advance the work strip; power-driven shearing mechanism; and means under control of the work-clamping means to initiate the operation of the work strip-advancing means, and the shearing mechanism.

19. In a writing machine for printing on work strips, the combination with a group of selectively operable printing members; a travelling carriage; power-driven means to restore the travelling carriage to the beginning of a line; and a work-strip clamping means; of means operable concomitantly with the return of the travelling carriage, to intermittently advance the work strip; power-driven shearing mechanism; normally idle linkages to control the operation of the power-driven carriage-restoring and shearing mechanisms; means operable at will to actuate the work-clamping means and the carriage-return linkage control, and to trip the linkage controlling the shearing mechanism; and means to restore the last-named linkage to normal irrespective of the position of the means.

20. In a writing machine, the combination with a frame; a flat platen shiftable relatively to the frame to clamp and release a work strip; a key carriage shiftable relatively to the platen in line and letter spacing directions, and return; and means to shift the platen to cause it to clamp and to release the work strip; of carriage-controlled means to intermittently feed the work strip to and past the printing position on the platen prior to writing thereon; and means operable incident to shifting the platen for releasing the work, to sever the leading end of the work strip.

21. In a writing machine, the combination with a frame; a flat platen shiftable relatively to the frame to clamp and release a work strip; a key carriage shiftable relatively to the platen in line and letter spacing directions, and return; and means to shift the platen to cause it to clamp and to release the work strip; of carriage-controlled means to intermittently feed the work strip to and past the printing position on the platen prior to writing thereon; and means operable in timed relation with the shift of the platen for releasing the work, to sever the leading end of the work strip.

22. In a machine for writing on work strips having spaced perforations, the combination with a platen; and an element adapted to traverse the platen in letter spacing direction and return; of a feed finger operable by the travelling element, to enter a perforation in a work strip and draw it across the platen in contra-letter spacing direction as the travelling element returns to the beginning of a line.

23. In a writing machine, the combination with a platen, and a key mechanism relatively shiftable in line and letter spacing directions and return; of a feed finger mounted to travel with the key mechanism, and adapted to engage a work strip to advance the latter in the direction of return of the key mechanism, as said key mechanism returns towards the beginning of a line, whereby to eject a previously printed section of the work strip from the platen, and draw an unprinted section to printing position; means to lock the key mechanism against line spacing travel; and means to withdraw the lock and to disable the feed finger, to enable movement of the key mechanism in line spacing direction.

24. In a writing machine, the combination with a platen, and a key carriage having a set of selectively operable keys and printing members, to traverse the platen in letter spacing direction and return; of a feed finger carried by the key carriage and effective to engage a work strip to advance the latter in the direction of return of the key carriage coincidently with the return of the carriage to the beginning of a line, the feed finger adapted for automatic disengagement from the work strip as the carriage advances in letter spacing direction; and means to maintain the feed finger disengaged from the work, to prevent damage thereto when the key carriage is shifted in line spacing direction.

25. In a writing machine, the combination with a platen, and a carriage traversing the platen in letter and in line spacing directions and return; of a feed means associated with the carriage to lead a work strip over the platen step-by-step, including a feed dog adapted to engage and disengage from the work; a key having a predetermined travel of greater extent than the feed dog; and a compensating connection between the key and the dog to enable the key to shift the dog, and to complete its full stroke despite the short travel of the dog.

26. In a writing machine, the combination with a platen, and a key mechanism having relative movement in letter spacing direction and return; means to releasably clamp a work strip in printing position; means to relieve the clamping action to enable the work strip to be fed over the platen; and means to feed the work strip to displace the printed section of the strip from the printing area and substitute an unprinted section therefor; of a severing means to cut off the printed sections successively; a motor to operate the severing means; a normally interrupted connection between the motor and the severing means; and means operable by the clamp-relieving means to complete the connection between the motor and the severing means.

27. In a writing machine, the combination with a platen and a key mechanism having relative movement in letter spacing direction and return; means to releasably clamp a work strip in printing position; means to relieve the clamping action to enable the work strip to be fed over the platen; and means to feed the work strip to displace the printed section of the strip from the printing area and substitute an unprinted section therefor; of a severing means to cut off the printed sections successively; a motor to operate the severing means; drive connections between the motor and the severing means including a clutch, and means to render the clutch inffectitve; and means operable by the clamp-relieving means to trip the last-named means, and enable the clutch to become effective.

28. The combination with a writing machine of the type wherein a traveling writing mechanism is shiftable in letter spacing direction and return, relatively to a subjacent platen supporting record material; means with which the platen co-acts to releasably clamp the record material in printing position; means to release the clamping action; feed means for intermittently advancing the record material over the platen to present successive portions thereof in writing position, and to eject the printed portions from writing position, during the time of release of the clamping means, including a motor to return the writing mechanism in contra-letter spacing direction, and record engaging means operated by the writing mechanism; and multiple control means for the motor, including a control means operable by the writing mechanism upon its arrival at a predetermined point in its letter spacing travel, and a second control means operable by the clamp-releasing means, the operation of both control means being necessary to the operation of the motor.

29. The combination with a writing machine of the type wherein a traveling writing mechanism is shiftable in letter spacing direction and return, relatively to a subjacent platen supporting record material; means with which the platen co-acts to releasably clamp the record material in printing position; means to release the clamping action; feed means for intermittently advancing the record material over the platen to present successive portions thereof in writing position, and to eject the printed portions from writing position, during the time of release of the clamping means, including a motor to return the writing mechanism in contra-letter spacing direction, and record engaging means operated by the writing mechanism; means to sever the ejected printed portions of the record material; a one-cycle actuating motor for the severing means; connections including a normally idle clutch between the motor and the severing means; multiple control means for the first-named motor, one of which is automatically operated and another of which is operated at will, the operation of both control means being necessary to the operation of the motor; and means operable concomitantly with the operation of the last-named control means to trip the clutch for operation.

30. The combination with a writing machine of the type wherein a traveling writing mechanism is shiftable in letter spacing direction and return, relatively to a subjacent platen supporting record material; means with which the platen co-acts to releasably clamp the record material in printing position; means to release the clamping action; feed means for intermittently advancing the record material over the platen to present successive portions thereof in writing position, and to eject the printed portions from writing positions, during the time of release of the clamping means, including a motor to return the writing mechanism in contra-letter spacing direction, and record engaging means operated by the writing mechanism; and multiplpe control means for the motor, one of which is automatically operated in timed relation with the letter-spacing advance of the writing mechanism, and the other of which is operable at will, the operation of both control means being necessary to the operation of the motor.

31. In a writing machine, the combination with a shiftable platen; means coacting with the platen to clamp a continuous work strip in place; means to release the clamping action on the work; and selective manipulative printing members to print upon the work; of means to intermittently feed the work strip to and past the printing zone of the platen in timed relation with the release of the clamping action thereon; and means likewise operable in timed relation with, and incident to, the operation of the means to release the clamping action on the work, to mechanically effect a step-by-step feed of a combined manifolding and record medium which traverses a path transverse to that along which the work strip is fed across the platen.

32. In a machine for writing on work strips, the combination of means to guide the work strips, including spaced parallel ways to confine the opposite side edges of superposed work strips between which work sheets a manifolding strip is threaded transversely thereof; and shields arranged between the parallel confining ways at the intersection of the work strips and the manifolding strip, and above and below the manifolding strip to guide and protect the adjacent side edge of the manifolding strip.

33. In a writing machine, the combination with a platen; means coacting with the platen to grip a plurality of work strips led across the platen, against accidental displacement; and means to release the work strips; of means controlled by the work strip-releasing means, to feed the work strips simultaneously step by step across the platen; means likewise controlled by the work strip-releasing means to mechanically sever the leading ends of the strips; and means also controlled by the work strip-releasing means to feed a manifolding and record medium transversely of the work strips during the release of the latter.

34. In a writing machine, the combination with releasable means to grip a continuous work strip against accidental displacement while being printed; and means to release the gripping means; of means under control of the means which releases the gripping means, to automatically advance the work strip to advance the leading section of the work strip past the printing point, and bring a successive section thereof to the printing point; means also under control of the means which releases the gripping means, to sever the leading section of the work strip subsequently to its advance; and additional means to impart a step-by-step feed to a combined manifolding and record strip arranged to travel transversely of the work strip, at a time during which the work strip is released from its gripping means.

35. In a writing machine, including a carriage, adapted for letter spacing travel and return; the combination with releasable means to grip a continuous work strip against accidental displacement while being printed; and means to release the gripping means; of means operable by the carriage and incident to its return, to advance the continuous work strip in contra-letter spacing direction through a distance substantially equal to the distance through which the carriage has advanced from its starting point; automatically operable severing means under control of the means which releases the gripping means; and means to feed a combined manifolding and record strip intersecting the plane of travel of the work strip at the printing zone, during the release of the gripping means.

36. In a writing machine, including a carriage adapted for letter spacing travel and return; the combination of a feed member mounted to traverse a work strip with the carriage to alternately engage and disengage the work strip and thereby intermittently advance the latter incident to the return of the carriage from an advanced position to its starting point.

37. In a writing machine, including a carriage adapted for letter spacing travel and return; the combination of a feed member mounted to traverse a work strip with carriage to alternately engage and disengage the work strip and thereby intermittently advance the latter incident to the return of the carriage from an advanced position to its starting point; and manually operable means to displace the feed member relatively to the work strip to facilitate movement of the carriage transversely of the work strip.

38. In a writing machine, including a carriage adapted for letter spacing travel and return, and for movement in a direction transverse to the direction of letter spacing travel, the combination of a feed member mounted to traverse a work strip with the carriage to alternately engage and disengage the work strip, whereby to advance the latter incident to the return of the carriage from an advanced position to its starting point; means to retain the carriage in one of its adjusted positions against movement transversely to its direction of letter spacing travel; and manual means to release the retaining means, and to shift the feed member to a position out of contact with the work strip, preliminary to such transverse movement of the carriage.

39. In a writing machine, the combination with a platen to support a continuous work strip and a continuous manifolding and record strip arranged in transverse relation, one overlying the other; and a carriage adapted to travel in letter spacing direction and return; of a feed member operable during return of the carriage, to engage the work strip at a point beyond the path of travel of the associated strip, to draw such work strip step by step across the platen, the work strip having spaced reinforcements to facilitate engagement of the feed member therewith; and means located adjacent one edge of the strip which lies transversely to the work strip, to prevent contact of the reinforcements with the edge of the transverse strip.

GUY W. EDMUNDS.